(12) United States Patent
Uchisasai et al.

(10) Patent No.: US 7,520,351 B2
(45) Date of Patent: Apr. 21, 2009

(54) POWER CONTROL UNIT

(75) Inventors: Hiroaki Uchisasai, Wako (JP); Hiroyuki Kojima, Wako (JP); Yoshiaki Tsukada, Wako (JP); Takashi Ozeki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 411 days.

(21) Appl. No.: 11/349,167

(22) Filed: Feb. 8, 2006

(65) Prior Publication Data

US 2006/0180363 A1    Aug. 17, 2006

(30) Foreign Application Priority Data

Feb. 15, 2005  (JP)  ............... 2005-38316
Feb. 17, 2005  (JP)  ............... 2005-40567
Mar. 16, 2005  (JP)  ............... 2005-74885

(51) Int. Cl.
    *B60L 11/02*    (2006.01)
(52) U.S. Cl. ................ 180/65.2; 180/65.3; 180/65.4; 701/22
(58) Field of Classification Search ........... 701/22; 180/65.2, 65.3, 65.4
    See application file for complete search history.

(56) References Cited

U.S. PATENT DOCUMENTS

| | | | | |
|---|---|---|---|---|
| 3,837,419 | A * | 9/1974 | Nakamura | 180/65.4 |
| 5,533,583 | A * | 7/1996 | Adler et al. | 180/65.4 |
| 6,278,915 | B1 * | 8/2001 | Deguchi et al. | 701/22 |
| 6,330,498 | B2 * | 12/2001 | Tamagawa et al. | 701/22 |
| 6,795,755 | B2 * | 9/2004 | Keilhofer et al. | 701/22 |
| 7,279,801 | B2 * | 10/2007 | Kagoshima | 290/40 C |

FOREIGN PATENT DOCUMENTS

| | | |
|---|---|---|
| DE | 41 33 014 A1 | 4/1993 |
| DE | 696 30 183 T2 | 8/2004 |
| EP | 0 769 402 B1 | 10/2003 |
| JP | 8-232697 A | 9/1996 |
| JP | 9-58295 A | 3/1997 |
| JP | 10-35329 A | 2/1998 |
| JP | 11-164406 A | 6/1999 |
| JP | 2000-23312 A | 1/2000 |
| JP | 2000-225858 A | 8/2000 |
| JP | 2001-63392 A | 3/2001 |
| JP | 2003-235107 A | 8/2003 |
| KR | 2000-0019322 A | 4/2000 |
| KR | 2002-0035435 A | 5/2002 |
| KR | 2003-0017810 A | 3/2003 |

* cited by examiner

*Primary Examiner*—Christopher P Ellis
*Assistant Examiner*—Cynthia F Collado
(74) *Attorney, Agent, or Firm*—Birch, Stewart, Kolasch & Birch, LLP

(57) ABSTRACT

A hybrid vehicle includes an engine and a drive motor which adds power to power generated by the engine in a superimposed manner to assist the engine. A power control unit includes: a fourth rotor sensor as a vehicle speed sensor which detects vehicle speed of the hybrid vehicle; an accelerator sensor which detects an amount of accelerator operation; and an ECU having an assist map which determines an output command reference value for the drive motor based on the vehicle speed and the amount of accelerator operation. The ECU outputs, to the drive motor, a corrected output command value which is calculated by adding an additional value corresponding to a rate of change in the amount of accelerator operation, to the output command reference value obtained from the assist map.

10 Claims, 24 Drawing Sheets

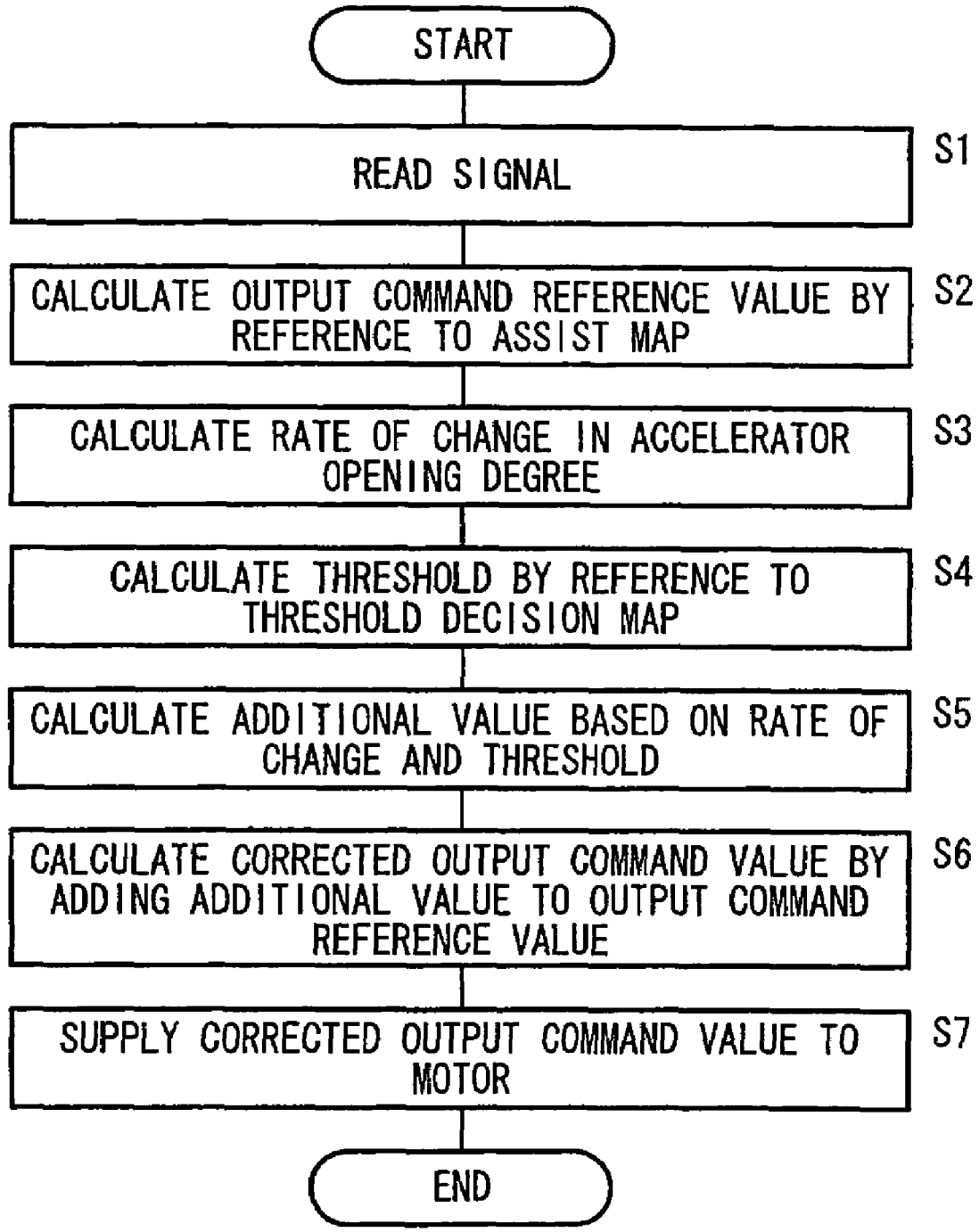

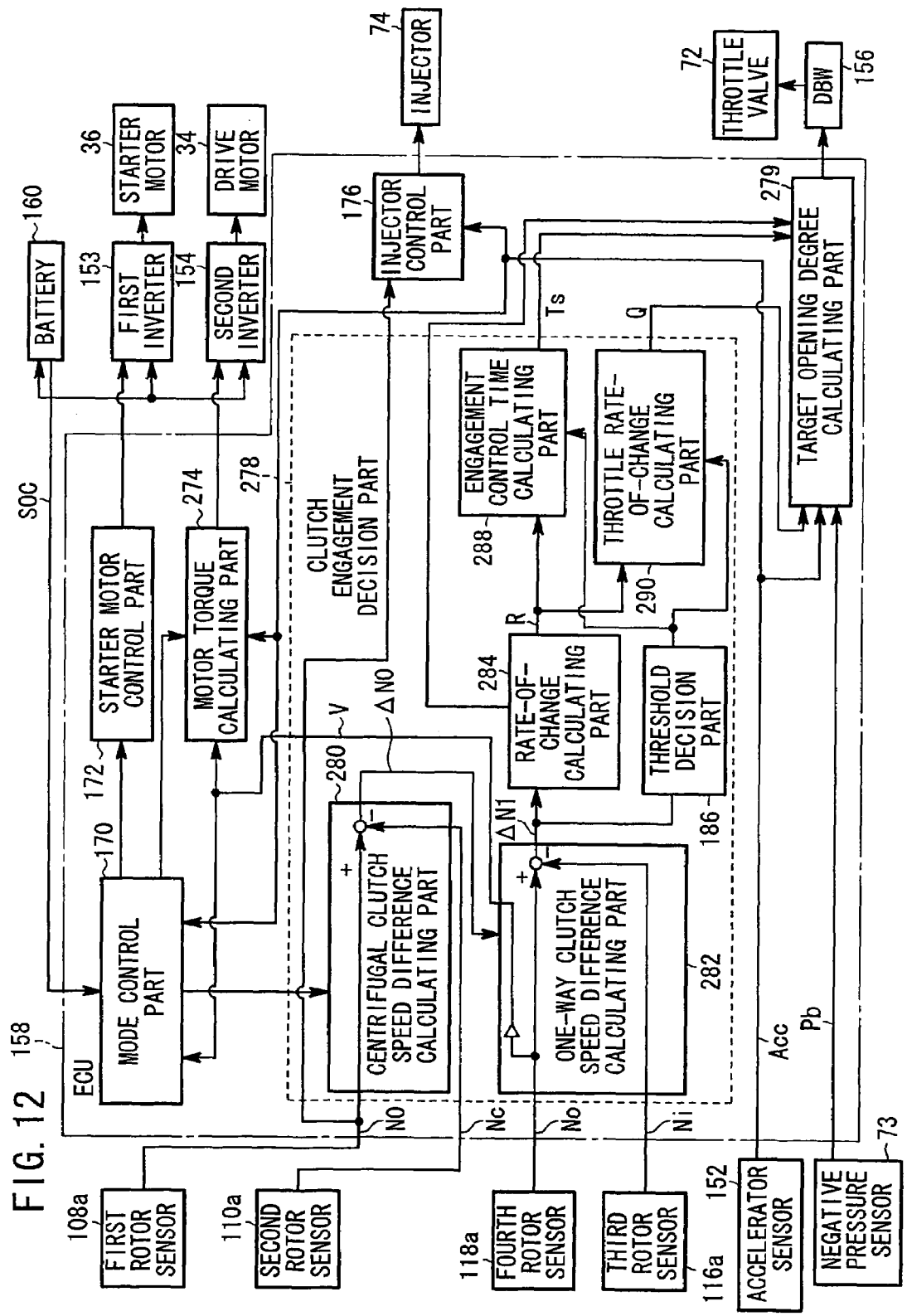

POWER CONTROL UNIT

BACKGROUND OF THE INVENTION

1. Field of the Invention

The present invention relates to a power control unit in a hybrid vehicle having an engine which generates power to be transmitted to a driving wheel and a motor which adds power to the power generated by the engine in a superimposed manner to assist the engine.

2. Description of the Related Art

In recent years, hybrid vehicles which combine an internal combustion engine and an electric motor to generate power and transmit it to driving wheels have been developed and commercialized for reduction in fuel consumption and gas emissions.

In a hybrid vehicle, since the generated torque can be varied easily by controlling electric power to the motor, a device which uses this feature to give a rider a driving feeling which he/she desires has been proposed in JP-A No. 58295/1997 (Japanese Laid-Open Patent Publication No. 9-58295). In this device, three control modes are available where different torque amounts are generated in response to the amount of accelerator operation; in the first control mode, the torque increases gradually in response to the amount of accelerator operation; in the second control mode, the torque increases sharply; and in the third control mode, the torque increases in a manner expressed by a quadratic curve. The rider selects one of these control modes operating a control mode selector switch and the selected control mode is executed under the influence of a prescribed control part.

When the second control mode is selected, the torque increases largely in response to change in the amount of accelerator operation and thus a high response driving feeling is realized.

However, for acceleration in an actual vehicle driving situation, the rider may not only increase the absolute amount of accelerator operation but also intuitively increase the rate of change in the amount of accelerator operation, namely the accelerator operation speed. This is because the rider instinctively feels that a higher acceleration speed will be obtained by operating the accelerator quickly. However, in the device as described in JP-A No. 58295/1997, even if only the operation speed is increased, the driving feeling does not change and the acceleration speed which the rider desires cannot be obtained.

In the device described in JP-A No. 58295/1997, in order to change the driving feeling, the rider must read a manual or the like to understand the characteristic of each control mode and operate the control mode selector switch according to the driving condition.

A hybrid vehicle has different driving modes such as an engine driving mode in which it is driven by an engine only, a motor driving mode in which it is driven by a motor only, and a hybrid mode in which the motor assists the engine in driving it, so that the driving mode is switched automatically depending on the running condition or battery charge condition.

In a hybrid vehicle described in JP-A No. 23312/2000 (Japanese Laid-Open Patent Publication No. 2000-23312), a clutch is provided between an engine and a motor and the driving mode is switched by engaging or disengaging the clutch. In other words, in the motor driving mode, the clutch is disengaged and the motor is driven under the influence of a controller and power is transmitted to a driving wheel through a transmission or the like. On the other hand, in the engine driving mode, the clutch is engaged and the engine is driven so that the driving force of the engine is transmitted to the driving wheel for running.

When the driving mode is switched from the motor driving mode to the engine driving mode, if the driving force and rotation speed of the motor do not agree with those of the engine, some engagement noise may be generated by engagement of the clutch. In order to prevent such engagement noise, in the hybrid vehicle as described in JP-A No. 23312/2000, the torque of the engine and the torque of the motor are detected and while the motor absorbs the torque of the engine, the rotation speed of the clutch input shaft is made to agree with that of the clutch output shaft before the clutch is engaged.

In the hybrid vehicle described in JP-A No. 23312/2000, the torque and rotation speed of the engine and motor are controlled, which requires a complicated structure and a troublesome control sequence. Particularly, a torque sensor is generally expensive and complicated. Besides, there is concern that response to driving mode switching may deteriorate as the structure is complicated.

Traction control units which eliminate driving wheel slip which occur at the time of start or acceleration of a vehicle on a low-friction road surface such as a frozen, snowy or muddy road surface and improve the starting or accelerating ability of the vehicle have been known. The problem of driving wheel slip is solved by applying a braking force or decreasing engine output.

As a technique of decreasing engine output in occurrence of slip, JP-A No. 35329/1998 (Japanese Laid-Open Patent Publication No. 10-35329) discloses a traction control unit which stops fuel supply to the engine for driving the wheel. JP-A No. 232697/1996 (Japanese Laid-Open Patent Publication No. 8-232697) discloses a traction control unit which decreases engine output by delaying the time to ignite the engine. In connection with hybrid vehicles, JP-A No. 63392/2001 (Japanese Laid-Open Patent Publication No. 2001-63392) discloses a technique that in a hybrid vehicle in which front wheels are driven by an engine and a drive motor is connected to rear wheels, when a front wheel slips, a generator driven by the engine generates energy to lower the front wheel driving force and the energy generated by the generator is supplied to the drive motor, producing a four-wheel drive mode.

Generally known hybrid vehicle systems are: a "series hybrid system" in which only the motor is used for driving power and the engine is used only to drive the generator to generate electric energy; a "parallel hybrid system" in which both the motor and engine are used to drive the vehicle selectively depending on the running condition, etc.; and a "series parallel system" in which both the series hybrid system and the parallel hybrid system are selectively used depending on the situation or both are used.

Particularly in vehicles which adopt the series hybrid system, it may be difficult to eliminate slip by changeover from a two-wheel drive mode to a four-wheel drive mode as described in the above JP-A No. 63392/2001 because they often use a mechanism that transmits power of the engine and power of the drive motor to a driving wheel through the same drive shaft.

Furthermore, in the traction control disclosed in JP-A No. 35329/1998, in order to stop fuel supply to the engine, a fuel shutoff valve must be provided separately and the system cannot be used when the vehicle is driven by the motor, so another system must be provided for a situation that it is driven by the motor. Similarly, the traction control disclosed in JP-A No. 232697/1996 cannot be used when the vehicle is driven by the motor and another system must be provided for a situation that the vehicle is driven by the motor.

SUMMARY OF THE INVENTION

The present invention has been made in view of the above problems and has an object to provide a power control unit which eliminates the need for control mode selection and provides an adequate acceleration speed in response to the rider's accelerator operation.

The present invention has an object to provide a power control unit by which the driving mode is changed over through a simple structure and a simple control sequence and engagement noise generation accompanied by driving mode switching is suppressed.

An object of the present invention is to provide a power control unit which has a simple structure to eliminate slip in a hybrid vehicle in which power of the engine and power of the drive motor are transmitted to a driving wheel through the same drive shaft.

A power control unit according to the present invention is a power control unit in a hybrid vehicle which includes: an engine and a drive motor which generate a driving force for running; a vehicle speed sensor which detects a vehicle speed; an accelerator sensor which detects an amount of accelerator operation; and a control part having a reference value setting part which determines an output command reference value for the motor based on the vehicle speed supplied from the vehicle speed sensor and the amount of accelerator operation supplied from the accelerator sensor; it is characterized in that the control part outputs, to the drive motor, a corrected output command value calculated by adding an additional value corresponding to a rate of change in the amount of accelerator operation to the output command reference value obtained from the reference value setting part.

As mentioned above, the unit has the reference value setting part which determines an output command reference value for the motor and adds an additional value corresponding to a rate of change in the amount of accelerator operation, to the output command reference value obtained from the reference value setting part to calculate a corrected output command value, and controls the motor according to the calculated corrected output command value so that an adequate acceleration speed can be obtained in response to the rider's accelerator operation. In this case, since it is unnecessary for the rider to do control mode selection operation and to know characteristics of plural control modes, he/she can drive easily. Also, since a switch for control mode selection is not needed, the configuration is simpler.

The control part may add the additional value to the output command reference value and output the corrected output command value when the rate of change in the amount of accelerator operation exceeds a threshold. For example, if the threshold is set at a point which is considered to exceed the maximum output of the engine, the motor can compensate for the driving force insufficiency in the engine by adding an additional value to an output command reference value only when the rate of change in the amount of accelerator operation exceeds the threshold and as a consequence, an adequate acceleration speed is achieved.

The control part may make the additional value 0 when the rate of change in the amount of accelerator operation is below the threshold. In this case, when the rate of change in the amount of accelerator operation is small enough, a normal driving feeling is maintained.

The control part may change the threshold based on the vehicle speed, and also the control part may increase the threshold as the vehicle speed increases. This enables an adequate torque control which is suitable for the running condition of the hybrid vehicle.

A power control unit comprises: a one-way clutch with an input side connected with the engine and an output side connected with the drive motor; a throttle valve which regulates the throttle opening degree under the influence of a throttle motor; an input rotation sensor which detects the input rotation speed of the one-way clutch and supplies it to a control part; and an output rotation sensor which detects the output rotation speed of the one-way clutch and supplies it to the control part. The control part reads the amount of accelerator operation from the accelerator sensor, calculates a target opening degree for the throttle opening degree based on the amount of accelerator operation and activates the throttle motor so as to make the throttle opening degree agree with the target opening degree, calculates the speed difference between the input rotation speed and the output rotation speed, and when the speed difference is below a prescribed value, the target opening degree may be set to a value lower than a reference value calculated based on the amount of accelerator operation.

When the speed difference is below the prescribed value in this way, namely in the period from just before engagement of the one-way clutch through a prescribed engagement control time, by setting a target opening degree lower than the reference value, output of the engine is suppressed and the rate of increase in input rotation speed becomes gradual and the one-way clutch is smoothly engaged and engagement noise generation is suppressed. Also, torque sensors or torque estimation means are not needed on the input side and output side of the one-way clutch, leading to simplicity and inexpensiveness.

In this case, the control part resets the target opening degree to the reference value after a prescribed engagement control time has elapsed, so that a normal driving feeling is maintained after power switching.

The control part calculates an estimated engagement time for the one-way clutch to engage, based on the rate of change in the speed difference, and controls the throttle opening degree depending on the estimated engagement time, so that output of the engine can be decreased only during a more adequate period and quicker power switching and engagement noise reduction can be achieved.

It is desirable that the control part regulates the amount of decrease of the target opening degree with respect to the reference value depending on the rate of change in speed difference. Also, it is desirable that when the rate of change in speed difference is larger, the amount of decrease is set to a larger value. In sum, because generated engagement noise is considered to vary depending on the rate of change in speed difference, an adequate amount of decrease to reduce engagement noise can be set based on the rate of change calculated previously according to the running condition. This makes it possible to reduce engagement noise sufficiently and perform quick power switching without an unnecessary drop in output of the engine.

The present invention provides a power control unit in a hybrid vehicle which comprises: an engine; a transmission mechanism which transmits power of the engine to a driving wheel, a generator which generates electric energy by power of the engine; and a drive motor, coupled with the driving wheel, which generates power by output of the generator, where the vehicle is driven by power of at least one of the engine and the drive motor; and the power control unit may be characterized by providing the following means.

(1) It is characterized by including slip detecting means which detects a vehicle slip condition of the vehicle; and control means which controls output characteristic of at least one of the generator and the drive motor when a specific slip condition is detected.

(2) It is characterized in that it provides a first drive mode in which the vehicle is driven by power of the drive motor and a second drive mode in which the vehicle is driven by power of the engine, and when a specific slip condition is detected in the first drive mode, the control means performs such control as to either decrease output of the drive motor or make the drive motor function as a generator.

(3) It is characterized in that it provides a first drive mode in which the vehicle is driven by power of the drive motor and a second drive mode in which the vehicle is driven by power of the engine, and when a specific slip condition is detected in the second drive mode, the control means increases the electric energy generated by the generator.

(4) It is characterized in that when the slip condition is not eliminated by increasing the electric energy generated by the generator, the control means makes the drive motor function as a generator.

(5) It is characterized in that the slip detecting means includes: means which detects the rotational speed of a driven wheel; means which detects the rotational speed of the drive motor; and means which calculates the amount of slip based on the rotational speed of the driven wheel and the rotational speed of the drive motor.

(6) It is characterized by including: means which monitors the charge condition of a battery; and charge limiting means which makes generated electric energy consumed by an electrical load other than a battery if the remaining capacity of the battery is sufficient when the generator and the drive motor function as generators.

According to the present invention, the following effects are achieved.

(1) According to the aforementioned feature (1) in the present invention, in the hybrid vehicle in which power of the engine and power of the drive motor are transmitted through same drive shaft to the driving wheel, since the driving force is decreased by changing output characteristics of the existing generator and drive motor, traction control can be performed without an additional mechanical component, just by changing control of the generator and drive motor.

(2) According to the aforementioned feature (2) in the present invention, traction control can be performed by the use of the drive motor even in the series hybrid drive mode in which a generator always generates electric energy and therefore the generator can not be used for traction control.

(3) According to the aforementioned feature (3) in the present invention, traction control through the generator can be performed when the vehicle is driven by power of the engine.

(4) According to the aforementioned feature (4) in the present invention, even when traction control through the generator is insufficient when the vehicle is driven by power of the engine, slip can be prevented reliably by combination with traction control through the drive motor.

(5) According to the aforementioned feature (5) in the present invention, regarding the driving wheel, without separately providing a sensor for detecting its rotational speed, the rotational speed can be calculated using the existing sensor for detecting rotation of the drive motor.

(6) According to the aforementioned feature (6) in the present invention, even when the battery is fully charged, electric energy generated by the generator and the drive motor can be consumed by an electric load other than the battery and therefore regenerative braking for the driving wheel is possible.

The above and other objects features and advantages of the present invention will be become more apparent from the following description when taken in conjunction with the accompanying drawings in which preferred embodiments of the present invention are shown by way of illustrative example.

BRIEF DESCRIPTION OF THE DRAWINGS

FIG. 10 is a flowchart showing the motor control sequence which is performed by the power control unit;

FIG. 12 is a block diagram of the functional configuration of the ECU in which functions are selectively shown for switching the driving mode by a simple structure and control sequence, and for suppressing occurrence of connecting noise accompanying switching of the driving mode;

DESCRIPTION OF THE PREFERRED EMBODIMENTS

Figure 1:
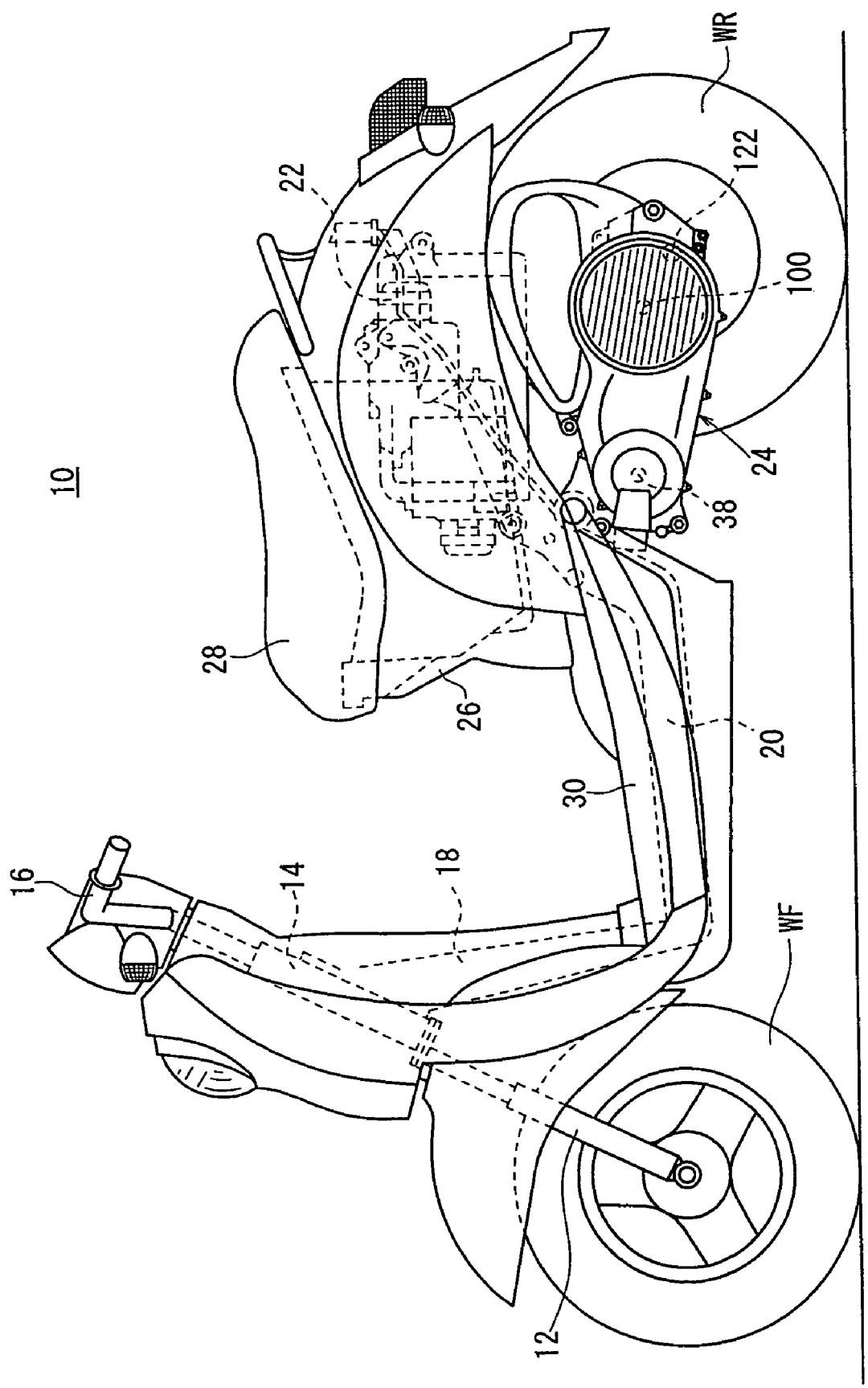
FIG. 1 is a side view of the hybrid vehicle on which the power control unit is mounted.

Next, a power control unit according to the present invention as an embodiment thereof will be described referring to the accompanying drawings FIGS. 1 to 24B. First, a hybrid vehicle 10 on which a power control unit 150 (see FIG. 5) according to this embodiment is mounted will be described referring to FIGS. 1 to 3.

The hybrid vehicle 10 is a scooter type motorcycle and has front forks 12 axially supporting a front wheel WF on the vehicle body front side and the front forks 12 are steered by means of a handlebar 16 through a head pipe 14. The right grip of the handlebar 16 can be rotated and functions as an accelerator. An amount of accelerator operation Acc (see FIG. 5) is detected by an accelerator sensor 152 (see FIG. 5).

A down pipe 18 is fitted backward and downward to the head pipe 14 and a middle frame 20 extends almost horizontally from the lower end of the down pipe 18. A rear frame 22 is fitted to the rear end of the middle frame 20 backward and upward.

A power unit 24 including a power source is partially connected with the rear end of the middle frame 20 and a rear wheel WR as a driving wheel is rotatably fitted to the rear end side of the power unit 24 and the unit 24 is suspended by a rear suspension attached to the rear frame 22.

The peripheries of the down pipe 18, middle frame 20 and rear frame 22 are covered by a body cover 26 and a seat 28 for a rider to sit on is fixed to the rear top of the body cover 26. A step floor 30 for the rider's feet to rest on is provided above the middle frame 20 between the seat 28 and the down pipe 18.

Figure 2:
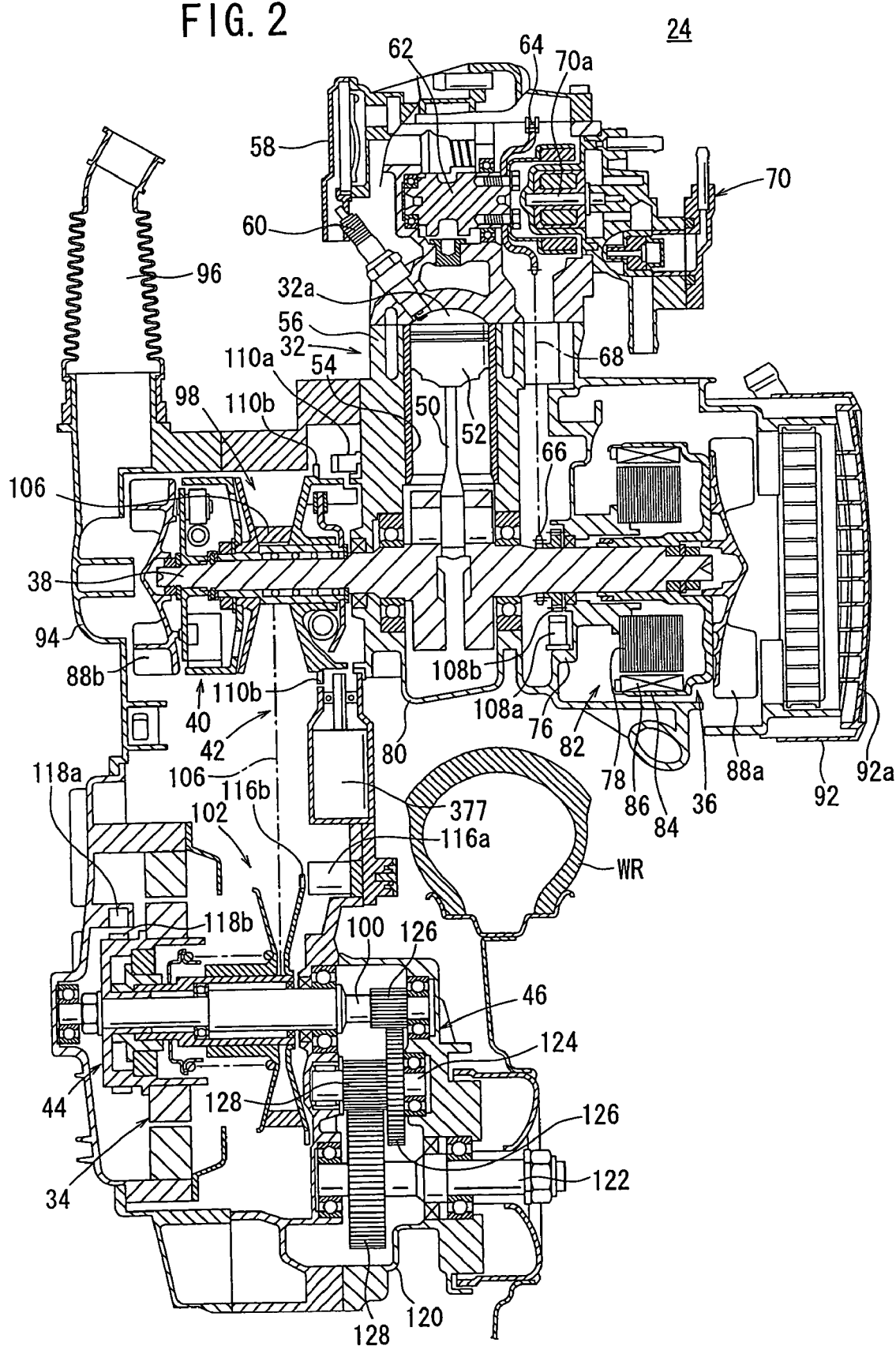
FIG. 2 is a sectional plan view of the power unit.
Figure 3:
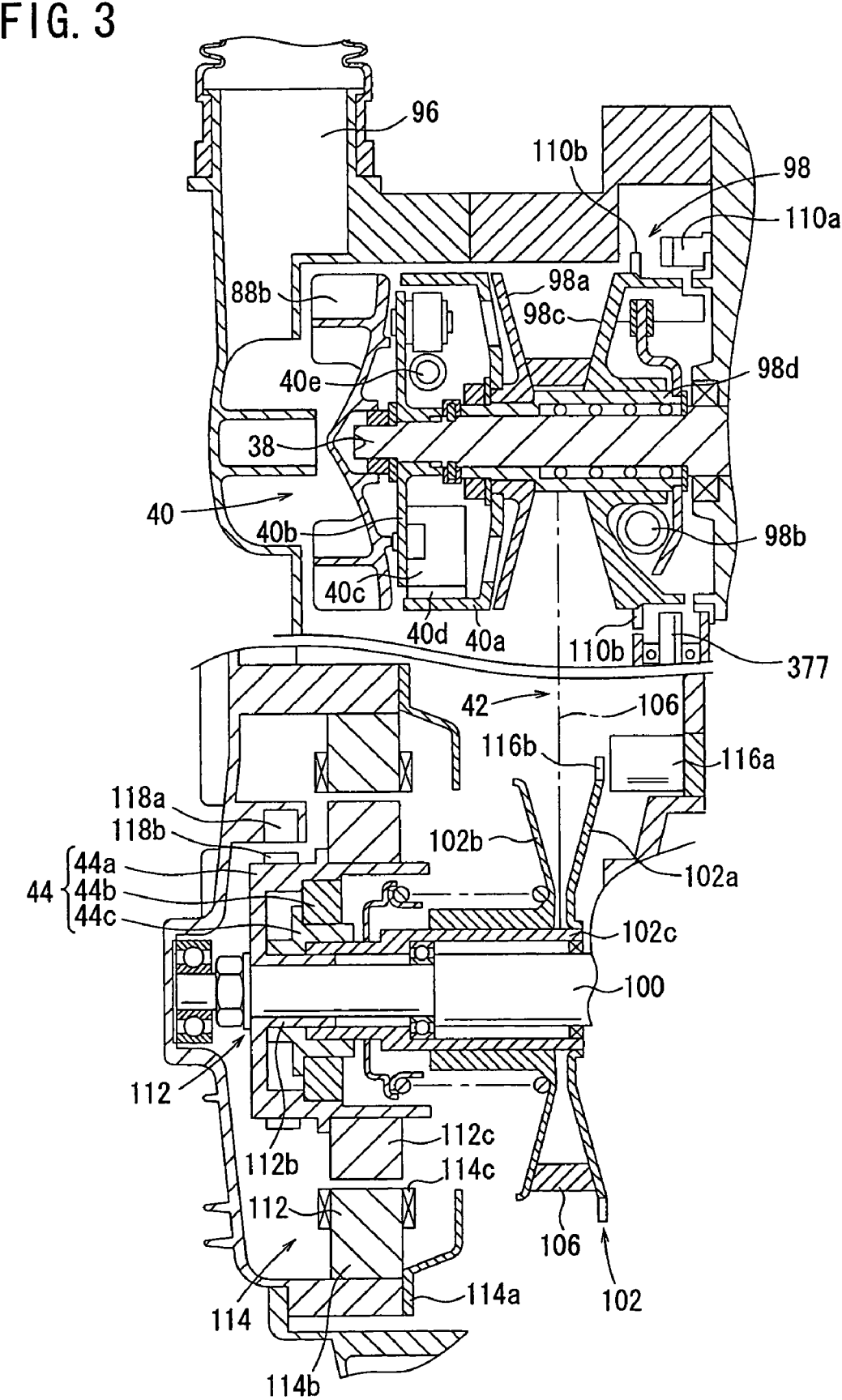
FIG. 3 is an enlarged sectional view of the CVT and its surroundings in the power unit.
Figure 4:
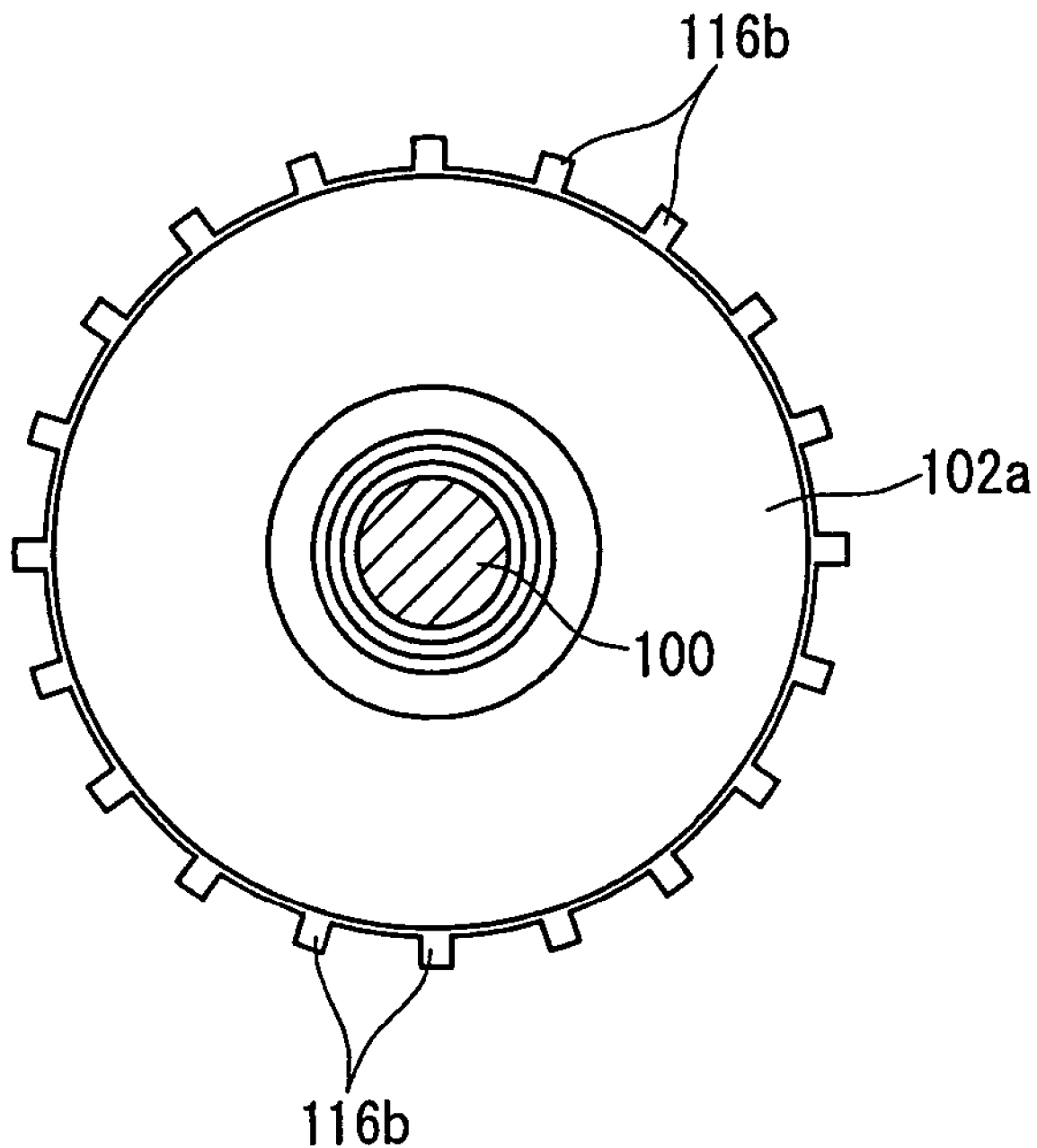
FIG. 4 is a side view of the driven fixed half pulley with detected objects disposed circularly on its outer periphery.

Next, the structure of the power unit 24 will be explained referring to FIGS. 2 and 3. FIG. 2 is a sectional plan view of the power unit 24 and FIG. 3 is a sectional view of it in a partially enlarged form, where the left-right direction corresponds to the vehicle width direction, the upward direction to the front of the vehicle and the downward direction to the rear of the vehicle.

As shown in FIG. 2, the power unit 24 includes: an engine 32 and a drive motor 34 which generate a driving force for running; a starter motor 36 which starts the engine 32; a centrifugal clutch 40 located on a crankshaft 38 of the engine 32; a CVT (Continuously Variable Transmission) 42 which changes the rotation speed of the crankshaft 38 through the centrifugal clutch 40 continuously; a one-way clutch 44 which transmits the supplied power in a single direction (direction of rotation for forward movement); and a reducer 46 which decreases the rotation speed and transmits it to the rear wheel WR. The starter motor 36 may be used not only to start the engine 32 but also as an auxiliary driving source for running. ACG starter which is also served for generating power may be used instead of the starter motor 36.

A piston 52 connected through a connecting rod 50 is provided on the crankshaft 38 of the engine 32. The piston 52 can slide inside a cylinder 54 and a cylinder block 56 is disposed so that the axis line of the cylinder 54 is almost horizontal. A cylinder head 58 is fixed on the front face of the cylinder block 56 and the cylinder head 58, cylinder 54 and piston 52 constitute a combustion chamber 32a where an air-fuel mixture is burned.

The cylinder head 58 contains a valve (not shown) which controls an air-fuel mixture to be taken into, or out of, the combustion chamber 32a and an ignition plug 60. The opening/closing of the valve is controlled by rotation of a cam shaft 62 axially supported by the cylinder head 58. A driven sprocket 64 is provided on one end of the cam shaft 62 and a circular cam chain 68 is put between the driven sprocket 64 and a driving sprocket 66 provided on one end of the crankshaft 38. A water pump 70 for cooling the engine 32 is provided on one end of the cam shaft 62. The water pump 70 is disposed in a way that its rotary shaft 70a rotates together with the cam shaft 62, and thus as the cam shaft 62 rotates, the water pump 70 is activated.

In an intake pipe path 71 (see FIG. 5) which communicates with the combustion chamber 32a, there are a throttle valve 72 for regulating the air intake, a negative pressure sensor 73 for detecting the pressure downstream of the throttle valve 72 and an injector 74 which emits a jet of fuel into the combustion chamber 32a.

A stator case 76 is connected on the right side of a crankcase 80 axially supporting the crankshaft 38 in the vehicle width direction and it houses the above starter motor 36. The starter motor 36 is a so-called outer rotor motor and its stator consists of a coil 82 in the form of conductor wires wound around teeth 78 fixed on the stator case 76. On the other hand, an outer rotor 84 is fixed on the crankshaft 38 and it has an almost cylindrical shape that covers the outer periphery of the stator. A magnet 86 is laid on the inner peripheral surface of the outer rotor 84.

A fan 88a for cooling the starter motor 36 is fitted to the outer rotor 84; and as the fan 88a rotates synchronously with the crankshaft 38, cooling air is taken in through a cooling air intake port 92a which is formed on a side face of a cover 92 of the stator case 76.

A case 94 is connected on the left side of the crankcase 80 in the vehicle width direction and it houses: a fan 88b fixed on the left end of the crankshaft 38; the above CVT 42 whose driving side is connected with the crankshaft 38 through the centrifugal clutch 40; and the drive motor 34 connected with the driven side of the CVT 42. The fan 88b is intended to cool the CVT 42 and drive motor 34 housed in the case 94 and located on the same side as the drive motor 34 with respect to the CVT 42, namely on the left side in the vehicle width direction.

A cooling air intake port 96 is formed in the case 94 on the front left side of the vehicle body; and as the fan 88b rotates synchronously with the crankshaft 38, outside air is taken into the case 94 through the cooling air intake port 96 located adjacent to the fan 88b to force the drive motor 34 and the CVT 42 to be cooled.

The CVT 42 includes: a drive transmission pulley 98 fitted through the centrifugal clutch 40 to the left end of the crankshaft 38 protruding from the crankcase 80 in the vehicle width direction; a drive shaft 100 which is axially supported by the case 94 through its axis line parallel to the crankshaft 38; and a driven transmission pulley 102 fitted to the drive shaft 100 through the one-way clutch 44. The CVT 42 further includes a circular V belt 106 which is wound between the drive transmission pulley 98 and the driven transmission pulley 102, constituting a so-called belt converter.

In the CVT 42, as the number of rotations of the crankshaft 38 (namely the number of rotations of the engine N0) increases, a centrifugal force works on a weight roller 98b and a drive movable half pulley 98c moves toward a drive fixed half pulley 98a. Since the drive movable half pulley 98c comes closer to the drive fixed half pulley 98a by this amount of movement and the gap width of the drive transmission pulley 98 decreases, thus the position of contact between the drive transmission pulley 98 and the V belt 106 shifts outward in the radial direction of the drive transmission pulley 98 and the winding diameter of the V belt 106 increases. Accordingly, in the driven transmission pulley 102, the width of the gap made by a driven fixed half pulley 102a and a driven movable half pulley 102b becomes larger. In other words, in the CVT 42, due to the centrifugal force which depends on the number of rotations of the engine N0, the winding diameter of the V belt 106 changes continuously and the transmission gear ratio automatically and continuously changes.

As shown in FIG. 3, the centrifugal clutch 40 includes: a cup-shaped outer case 40a fixed on a sleeve 98d; an outer plate 40b fixed on the left end of the crankshaft 38; a shoe 40d fitted to the external line of the outer plate 40b through a weight 40c in a manner to be oriented outward in the radial direction; and a spring 40e for biasing the shoe 40d inward in the radial direction. In the centrifugal clutch 40, when the number of rotations of the engine N0 is below a prescribed value, power transmission between the crankshaft 38 and the CVT 42 is shut off. As the number of rotations of the engine N0 rises and exceeds the prescribed value, a centrifugal force on the weight 40c moves the weight 40c outward in the radial direction against an elastic force which works inward in the radial direction due to the spring 40e and thereby the shoe 40d pushes the inner peripheral surface of the outer case 40a with a force in excess of a prescribed level. This transmits the rotation of the crankshaft 38 through the outer case 40a to the sleeve 98d, which drives the drive transmission pulley 98 fixed on the sleeve 98d.

Next, the one-way clutch 44 has a cup-shaped outer clutch 44a, an inner clutch 44b inserted coaxially into the outer clutch 44a, and a roller 44c which transmits power from the inner clutch 44b to the outer clutch 44a in one direction only. The outer clutch 44a also serves as an inner rotor body for the drive motor 34 and is integral with the inner rotor body. Furthermore, the inner periphery of the inner clutch 44b and the left end of a boss 102c of the driven fixed half pulley 102a are splined to each other.

With this one-way clutch 44, power from the engine 32 or the drive motor 34 is transmitted to the rear wheel WR through a drive shaft 100 or reducer 46. On the other hand, when walking the vehicle or during regenerative operation, power from the rear wheel WR is not transmitted to the CVT 42 or engine 32 because the outer clutch 44a idles with respect to the inner clutch 44b; since the drive motor 34 absorbs this power, regenerative power generation can be performed efficiently.

The drive motor 34 is located on the vehicle body rear side in the case 94 in a way that the drive shaft 100 functions as a motor output shaft. The drive motor 34 is of the so-called inner rotor type and its inner rotor 112 includes: the drive shaft 100 which also functions as the output shaft of the CVT 42; an inner rotor body which is cup-shaped and splined to the drive shaft 100 at a boss 112b formed in its center, namely the inner clutch 44b; and a magnet 112c disposed on the opening side outer peripheral surface of the inner clutch 44b. A stator 114 consists of a coil 114c in the form of conductor wires wound around teeth 114b fixed on the stator case 114a in the case 94.

The reducer 46 is located in a transmission chamber 120 which is connected with the rear end right side of the case 94 and includes: an intermediate shaft 124 which is axially supported parallel to the drive shaft 100 and the axle 122 of the rear wheel WR; a first pair of reduction gears 126 formed on the right end of the drive shaft 100 and in the center of the intermediate shaft 124 respectively; and a second pair of reduction gears 128 formed on the right end of the intermediate shaft 124 and on the left end of the axle 122 respectively. Through this reducer 46, the rotation of the drive shaft 100 is decelerated at a prescribed reduction gear ratio and transmitted to the axle 122 of the rear wheel WR which is axially supported parallel to it.

A first rotor sensor 108a is provided in the vicinity of the crankshaft 38 and it detects the number of rotations of the engine N0 as the number of rotations on the input side by detecting, in a non-contact manner, the teeth of a gear 108b as a detected object which is provided on the crankshaft 38.

A second rotor sensor 110a is provided in the case 94 in the vicinity of the centrifugal clutch 40 and it detects the number of intermediate rotations Nc on the output side of the centrifugal clutch 40 by detecting, in a non-contact manner, plural detected objects 110b which are circularly disposed on the outer periphery of the shoe 40d.

A third rotor sensor 116a is provided in the vicinity of the driven fixed half pulley 102a in the case 94 and this third rotor sensor 116a detects the input rotation speed Ni of the one-way clutch 44 by detecting, in a non-contact manner, plural detected objects 116b (see FIG. 4) which are circularly disposed on the outer periphery of the driven fixed half pulley 102a.

A fourth rotor sensor 118a is provided in the vicinity of the one-way clutch 44 in the case 94 and it detects the output rotation speed No of the one-way clutch 44 by detecting, in a non-contact manner, plural detected objects 118b which are circularly disposed on the outer periphery of the outer clutch 44a. Since the output rotation speed No detected by the fourth rotor sensor 118a changes proportionally to the vehicle speed of the hybrid vehicle 10, based on the reducer 46's reduction gear ratio and the diameter of the rear wheel WR, the fourth rotor sensor 118a also serves as a vehicle speed sensor.

Figure 5:
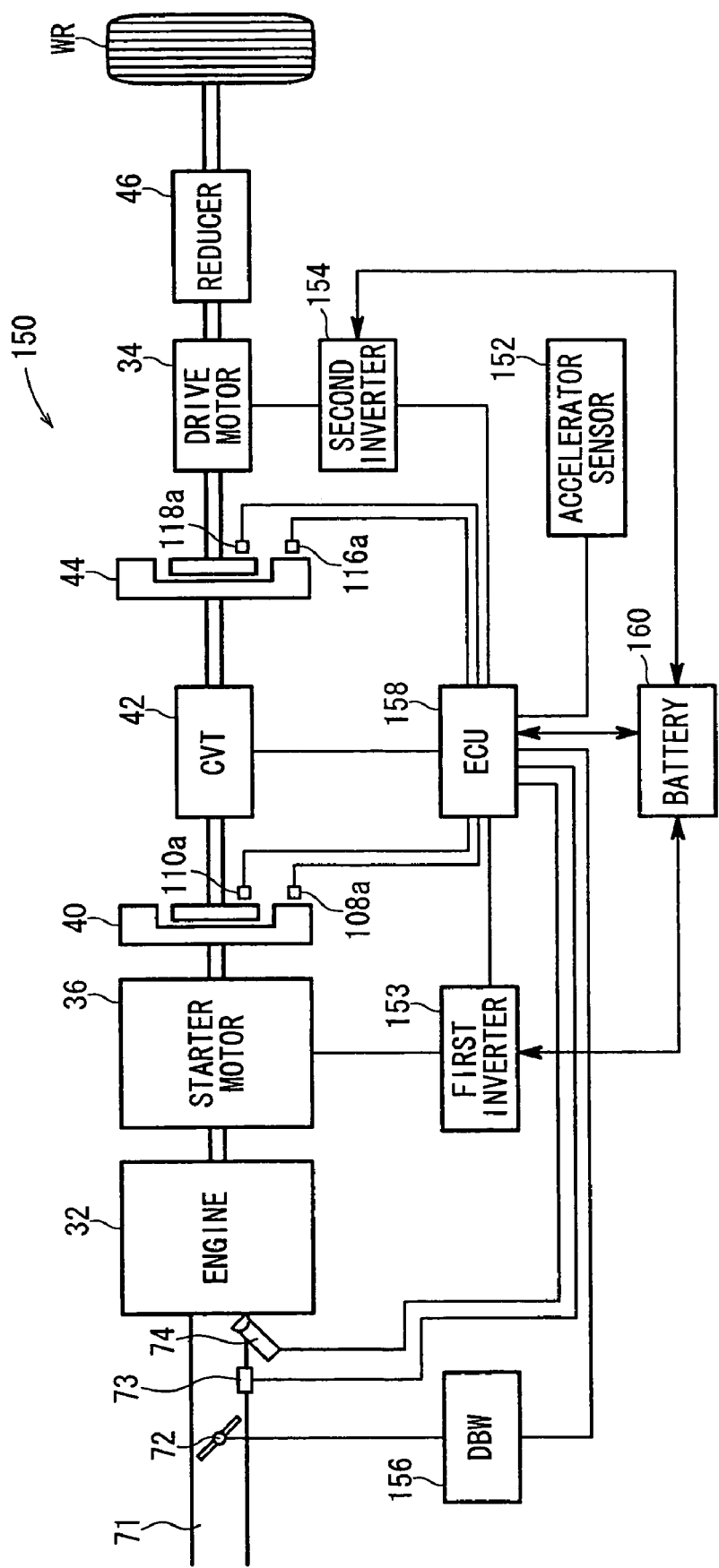
FIG. 5 is a block diagram of the power control unit according to this embodiment.

Next, the structure of a power control unit 150 according to this embodiment will be described referring to the block diagram of FIG. 5.

The power control unit 150 includes: an accelerator sensor 152 which detects an amount of accelerator operation Acc; a first inverter 153 and a second inverter 154 which respectively control the starter motor 36 and the drive motor 34; a DBW (Drive By Wire, control part) 156 which regulates the rotational angle of the throttle valve 72; and an ECU (Electric Control Unit, control part) 158 which comprehensively controls the hybrid vehicle 10. Also, the power control unit 150 includes the above first rotor sensor 108a, second rotor sensor 110a, third rotor sensor 116a and fourth rotor sensor 118a.

The first inverter 153 and the second inverter 154 perform drive control and regenerative control of the starter motor 36 and the drive motor 34 under the influence of the ECU 158 where, for regenerative control, electric power is supplied to a battery 160 to charge it. For the battery 160, a specific sensor detects the remaining amount of electric power SOC and sends it to the ECU 158. The DBW 156 regulates the rotational angle of the throttle valve 72 under the influence of the ECU 158 to control the amount of air intake for the engine 32.

In the hybrid vehicle 10, at the time of start of the engine, the starter motor 36 on the crankshaft 38 is used to rotate the crankshaft 38. At this time, the centrifugal clutch 40 is not engaged and power transmission from the crankshaft 38 to the CVT 42 is shut off.

Depending on the amount of operation of the throttle grip, when number of rotations of the crankshaft 38 exceeds a prescribed value (for example, 3000 rpm), rotational power of the crankshaft 38 is transmitted through the centrifugal clutch 40 to the CVT 42, one-way clutch 44 and reduction gear mechanism 46 to drive the rear wheel WR. At this starting moment, the drive motor 34 can be activated by electric power supply from the battery 160 to assist engine-driven rotation of the drive shaft 100.

The vehicle can be started by the drive motor 34 only instead of by the engine 32. In this case, rotation of the drive shaft 100 by the drive motor 34 is not transmitted to the driven transmission pulley 102 due to the one-way clutch 44 and therefore the CVT 42 is not driven. This improves energy transmission efficiency when the rear wheel WR is driven by the drive motor 34 only for running.

When the vehicle is driven only by the engine 32 and the load is large due to acceleration or high speed, the drive motor 34 can assist the engine in driving. In this case, rotational power of the crankshaft 38 generated by reciprocating motion of a piston 52 is transmitted to the drive shaft 100 through the centrifugal clutch 40, CVT 42 and one-way clutch 44 and power from the drive motor 34 is also transmitted to it, and this combined power drives the rear wheel WR through the reduction gear mechanism 46. By contrast, when the vehicle is driven by the drive motor 34 only, the engine 32 can assist the motor in driving.

When the vehicle runs at a constant speed (cruising) and only the drive motor 34 is used as a power source, if the engine 32 is activated but the number of rotations for the centrifugal clutch 40 as engaged (the above prescribed value) is not exceeded, electric energy can be generated by the starter motor 36 without activating the CVT 42.

When the vehicle runs at constant speed with only the drive motor 34 as a power source as mentioned above, power transmission from the drive motor 34 to the rear wheel WR takes place without activating the CVT 42 and therefore the energy transmission efficiency is excellent.

In deceleration, since the one-way clutch 44 does not transmit rotation of the drive shaft 100 to the driven transmission pulley 102 of the CVT 42, rotational energy of the axle 122 can be transmitted back to the drive motor 34 in a regenerative manner through the reduction gear mechanism 46 directly without activating the CVT 42. In other words, in regenerative transmission from the rear wheel WR to the drive motor 34, power transmitted from the rear wheel WR to the drive motor 34 is not consumed by activation of the CVT 42 so regenerative charging efficiency is improved.

Of functions provided in the power control unit 150, functions which both eliminate control mode selection operation and also obtain suitable acceleration according to accelerating operation by a driver will be described.

Figure 6:
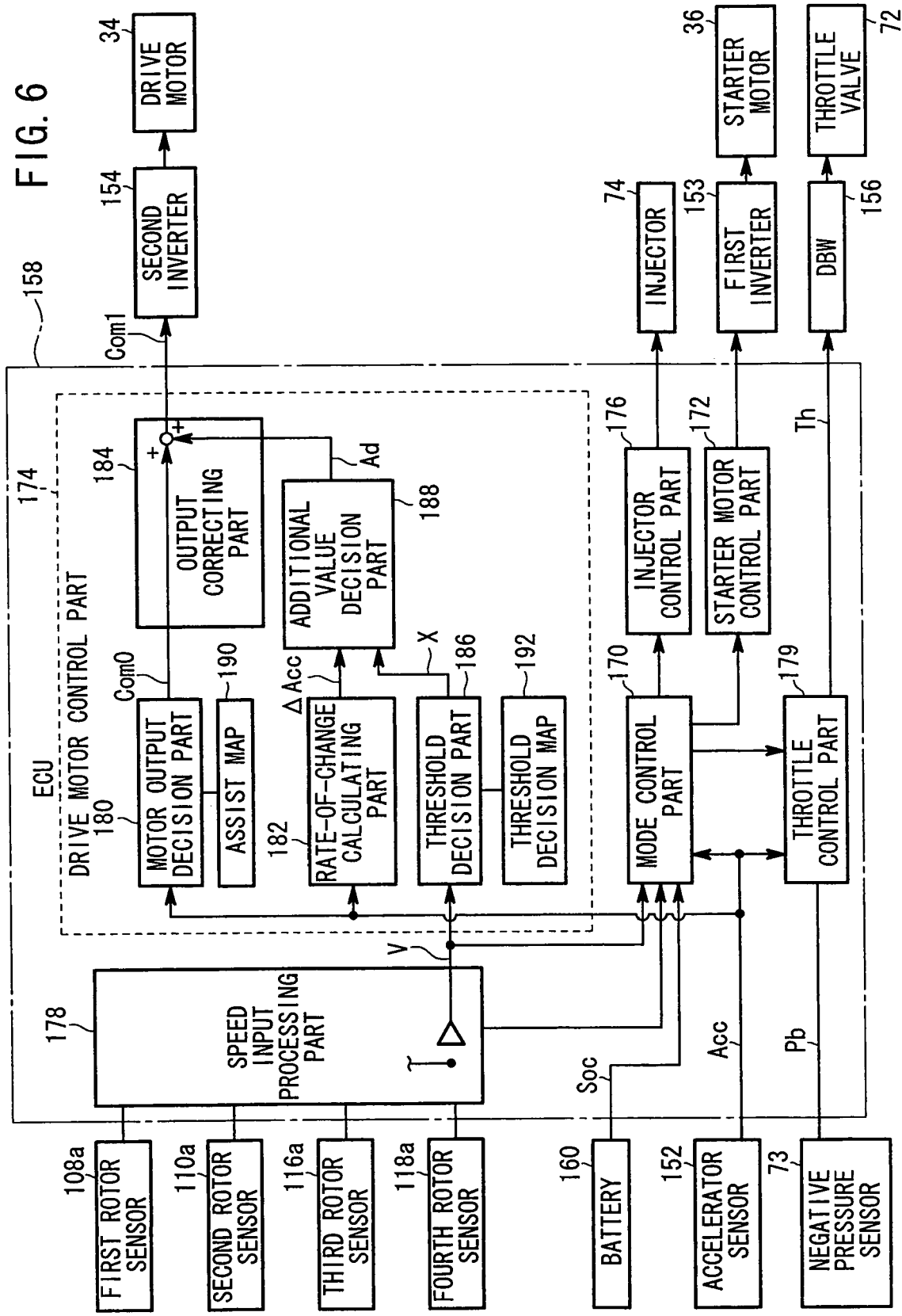
FIG. 6 is a block diagram of the functional configuration of the ECU selectively showing functions which eliminate a control mode selection operation and obtain suitable acceleration according to accelerating operation by a driver.

FIG. 6 is a block diagram which is selectively shown for getting across such functions out of the functions provided in the ECU 158.

As shown in FIG. 6, the ECU 158 includes: a mode control part 170 which decides a driving mode according to the running condition judged based on the remaining amount of electric power SOC, vehicle speed V, the amount of accelerator operation Acc and the like; a starter motor control part 172 which decides a start timing of the engine 32 based on the driving mode and the like and gives the first inverter 153 a command to start the starter motor 36; and a drive motor control part 174 which calculates the drive torque of the drive motor 34 based on the vehicle speed V and the amount of accelerator operation Acc. The ECU 158 further includes: an injector control part 176 which sets the volume and timing of fuel injection by an injector 74 based on the number of rotations of the engine N0; a speed input processing part 178 which performs input processing for the number of rotations of the engine N0, the number of intermediate rotations Nc, input rotation speed Ni and output rotation speed No; and a throttle control part 179 which calculates a target throttle opening degree Th based on the amount of accelerator operation Acc and supplies it to the DBW 156. The speed input processing part 178 calculates a vehicle speed V by multiplying output rotation speed No by a coefficient and supplies it to the drive motor control part 174. In the speed input processing part 178, the state of connection of the centrifugal clutch 40 and the one-way clutch 44, the transmission gear ratio of the CVT 42 and so on are calculated based on the speed difference between the number of rotations of the engine N0 and the number of intermediate rotations Nc or the speed difference between output rotation speed No and input rotation speed Ni and these data are supplied to the mode control part 170.

The driving modes which are selected by the mode control part 170 include: an EV driving mode (or electric driving mode) in which the vehicle runs by a driving force of the drive motor 34 only; an engine driving mode in which it runs by a driving force of the engine 32 only; and a hybrid driving mode in which both the drive motor 34 and the engine 32 are driven for it to run. Among them, the EV driving mode is selected when the remaining amount of electric power SOC is large and the running load is small, and the engine driving mode is selected when the remaining amount of electric power SOC is small or the running load is large. The hybrid driving mode is selected when the remaining amount of electric power SOC is large, the load is high and it is necessary for the drive motor 34 to assist the engine 32 or when output of the engine 32 is decreased to reduce fuel consumption, or in a similar case. The mode control part 170 gives the starter motor control part 172, drive motor control part 174 and injector control part 176 a given operation command depending on the selected driving mode.

The throttle control part 179 calculates a throttle target opening degree Th for driving the throttle valve 72, based on the amount of accelerator operation Acc and in reference to a negative pressure Pb supplied from a negative pressure sensor 73 and supplies it to the DBW 156. In the engine driving mode, the throttle target opening degree Th as calculated by the throttle control part 179 is basically proportional to the amount of accelerator operation Acc and corrected by the negative pressure Pb obtained from the negative pressure sensor 73 and other parameters.

The drive motor control part 174 includes: a motor output decision part 180 which sets an output command reference value Com0 for the drive motor 34 based on the amount of accelerator operation Acc; a rate-of-change calculating part 182 which calculates a rate of change ΔAcc in the amount of accelerator operation Acc; a threshold decision part 186 which calculates a threshold X (X>0) based on vehicle speed V; an additional value decision part 188 which calculates an additional value Ad as a value for correction of the output command reference value Com0; and an output correcting part 184 which calculates a corrected output command value Com1 based on the output command reference value Com0 and the additional value Ad and supplies it to the second inverter 154. The output correcting part 184 sets the corrected output command value Com1 by adding the additional value Ad to the output command reference value Com0.

Figure 7:
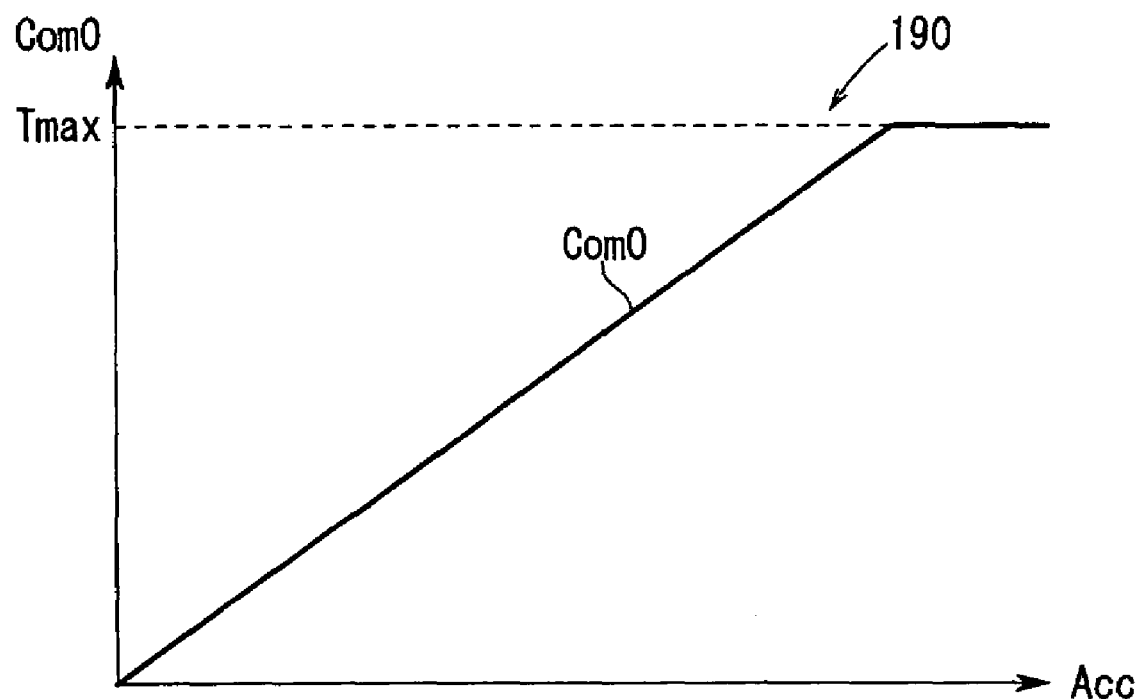
FIG. 7 is a diagram showing the content of the assist map.
Figure 8:
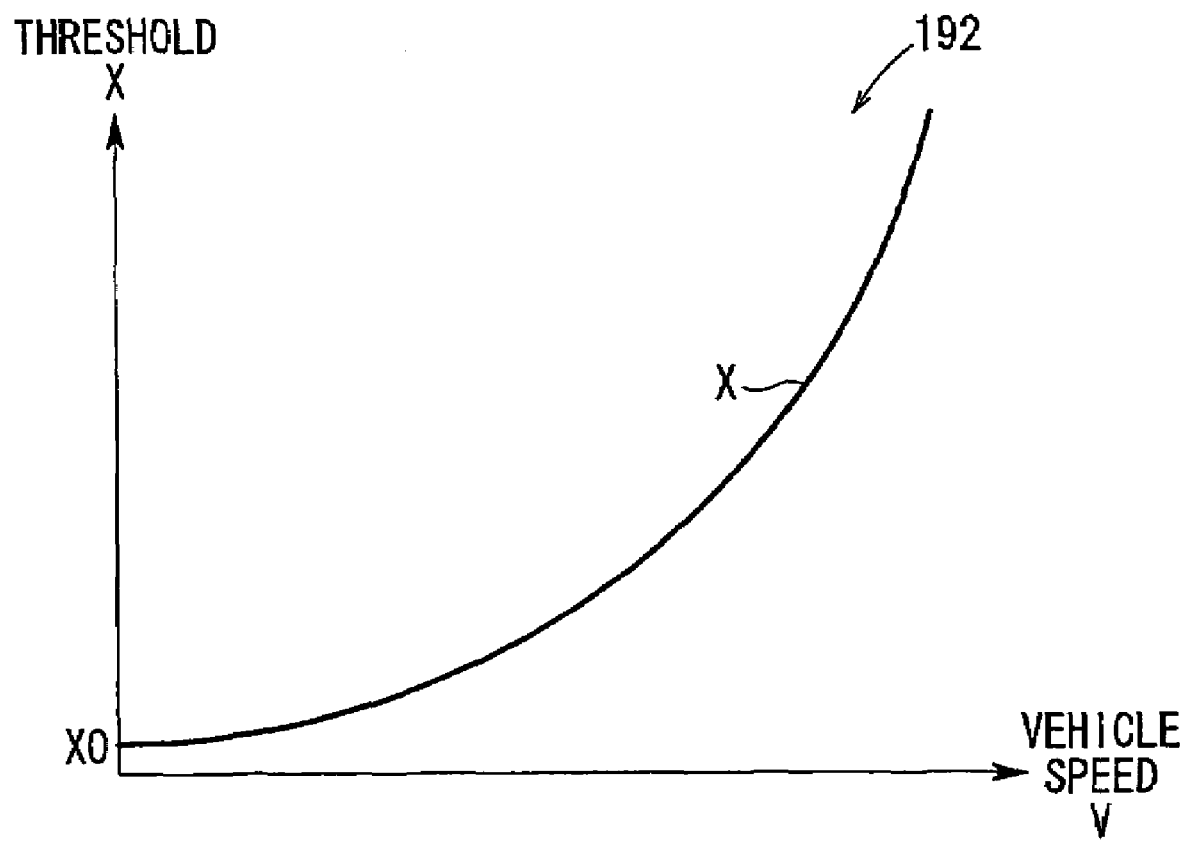
FIG. 8 is a diagram showing the content of the threshold decision map.

The motor output decision part 180 determines the output command reference value Com0 based on the amount of accelerator operation Acc by reference to an assist map (reference value setting part) 190 as shown in FIG. 7. The output command reference value Com0 in the assist map 190 is 0 when the amount of accelerator operation Acc=0, and as the amount of accelerator operation Acc increases, it increases proportionally; when the amount of accelerator operation Acc exceeds a prescribed value, it indicates a torque value Tmax which corresponds to 100% output. The assist map 190 is set based on the running characteristics of the hybrid vehicle 10 and the electrical characteristics of the drive motor 34 and the like.

As a parameter for determining the output command reference value Com0, for example, vehicle speed V, a torque value or the amount of accelerator operation Acc may be used.

The threshold decision part 186 determines the threshold X based on vehicle speed V by reference to a threshold decision map 192 (see FIG. 8) which shows the relation of the threshold X with respect to vehicle speed V. The threshold X is set in the threshold decision map 192 so that when vehicle speed V=0, it is small at X0 and as vehicle speed V increases, it increases in a manner as expressed by a quadratic curve. This threshold decision map 192 functions as follows: by setting the threshold X at a point where the maximum output of the engine 32 is considered to be exceeded, the additional value Ad is added to the output command reference value Com0 only when the rate of change ΔAcc exceeds the threshold X and thereby the drive motor 34 compensates for driving force insufficiency in the engine 32.

The assist map 190 and the threshold decision map 192 need not always be in the form of a map; they can be in whatever form as far as they can determine the output command reference value Com0 and the threshold X based on reference parameters. For example, they may be an adequate approximation formula or experimental formula (reference value setting part).

Figure 9:
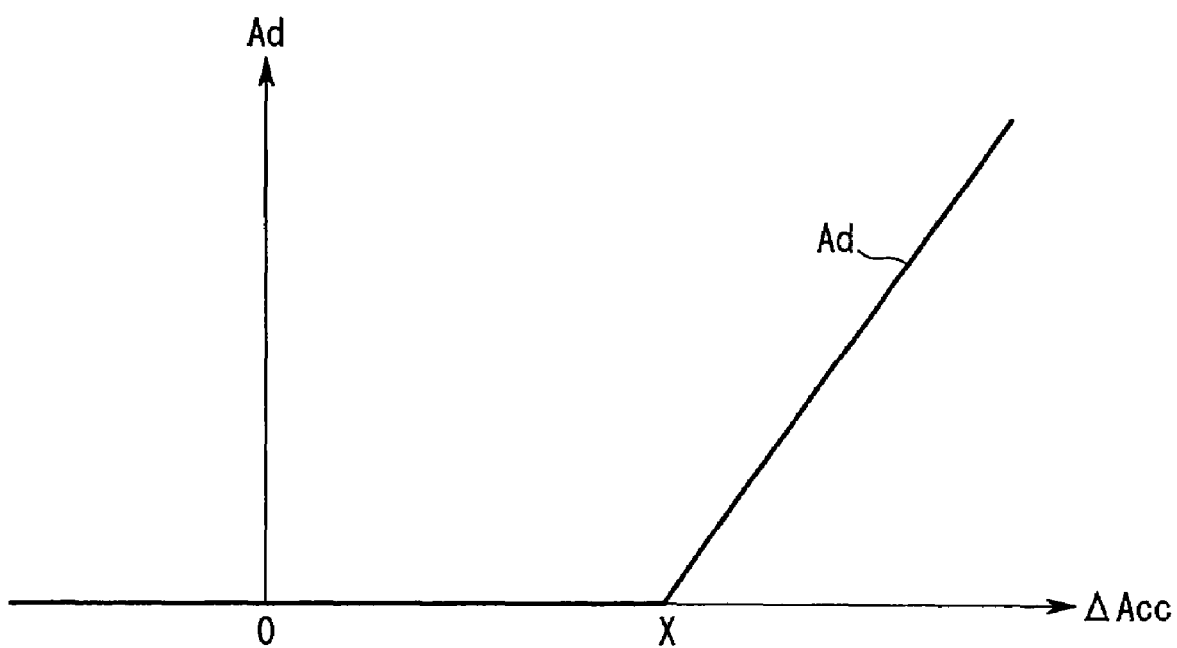
FIG. 9 is a graph showing the relation between a threshold and an additional value calculated by the additional value decision part.

The additional value decision part 188 works as follows: as shown in FIG. 9, when the rate of change ΔAcc at a specific time exceeds the threshold X at that time, the additional value Ad is set so as to increase in proportion to the difference between the rate of change ΔAcc and the threshold X, ΔAcc-X; when the rate of change ΔAcc is below the threshold X, ΔAcc is set to 0. Even when ΔAcc<0, ΔAcc is set to 0.

The ECU 158 has a CPU (Central Processing Unit) as a main control part, a RAM (Random Access Memory) and a ROM (Read Only Memory) as memory parts, a driver and so on; the above functional parts are implemented when the CPU loads a program and executes software processing in cooperation with the memory parts and so on. The assist map 190 and the threshold decision map 192 are stored in the memory parts including the ROM.

Figure 11A:
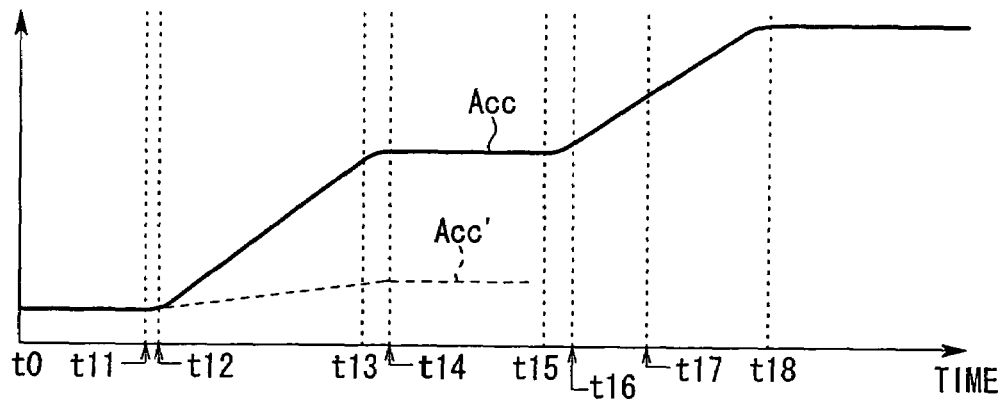
FIG. 11A is a time chart for the amount of accelerator operation.

Next, how the power control unit 150 thus structured functions will be described referring to FIGS. 10 to 11D. The processing sequence as shown in FIG. 10 is carried out by cooperation of the functional parts in the drive motor control part 174 at regular, very short time intervals successively. An explanation below is given assuming a concrete operational condition that the amount of accelerator operation Acc is constant in time zones from time t0 to t11, from t14 to t15 and from time t18 onward while it increases almost proportionally in time zones from t11 to t14 and from t15 to t18, as shown in FIG. 11A. It is assumed here that the driving mode is the hybrid driving mode or EV driving mode.

First, at step S1, signals for the number of rotations of the engine N0, input rotation speed Ni, the amount of accelerator operation Acc and so on are read from the first rotor sensor 108a, the fourth rotor sensor 118a, the accelerator sensor 152 and so on. Vehicle speed V is calculated based on output rotation speed No.

At step S2, the motor output decision part 180 calculates an output command reference value Com0 (see FIG. 11C) based on the read amount of accelerator operation Acc by reference to the assist map 190 (see FIG. 7) and supplies it to the output correcting part 184.

At step S3, the rate-of-change calculating part 182 calculates the difference between the amount of accelerator operation Acc read here and the corresponding previous value AccOLD as the rate of change ΔAcc (←Acc−AccOLD). The process at step S3 is a so-called differentiation process. In order to use the amount of accelerator operation Acc read here for a next calculation, Acc is substituted for AccOLD and stored and the calculated rate of change ΔAcc is supplied to the additional value decision part 188.

As shown in FIG. 11A, in the zones where the amount of accelerator operation Acc is increasing, namely time zones t11 to t14 and t15 to t18, the calculated rate of change ΔAcc is virtually trapezoidal in response to the amount of accelerator operation Acc, and in the other zones, ΔAcc=0.

At step S4, the threshold decision part 186 calculates the threshold X based on vehicle speed V by reference to the threshold decision map 192 (see FIG. 8) and supplies it to the additional value decision part 188. Through the process at step S4, as shown in FIG. 11B, the threshold X changes in response to vehicle speed V (see FIG. 1D); it increases in response to vehicle speed V in time zones from t11 to t14 and from t15 to t18 and is constant in the other time zones.

When the threshold X is set in this way, the rate of change ΔAcc exceeds the threshold X from time t12 (just after time t11) to time t13 (just before time t14) and from time t16 (just after time t15) to time t17. Since the threshold X is so determined as to increase in a manner as expressed by a quadratic curve (see FIG. 8), the rate increases in a manner as expressed by a quadratic curve from time t15 onward when vehicle speed V is relatively high. Therefore, time t17 at which the threshold X coincides with the rate of change ΔAcc is a bit later from time t16, and from t71 onward, the threshold X exceeds the rate of change ΔAcc.

At step S5, the additional value decision part 188 checks whether the rate of change ΔAcc exceeds the threshold X or not and if ΔAcc>X, an additional value Ad which increases in proportion to ΔAcc-X is calculated as shown in FIG. 9, and if ΔAcc≦X, Ad should be 0 (Ad←0). The calculated additional value Ad is supplied to the output correcting part 184.

Figure 11B:
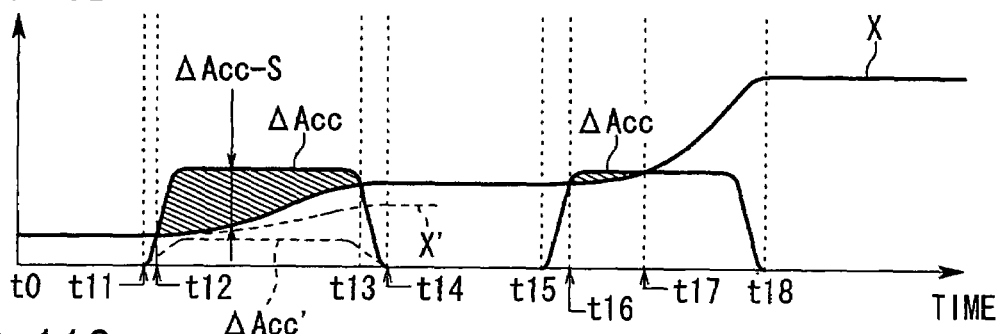
FIG. 11B is a time chart for the rate of change and the threshold.
Figure 11C:
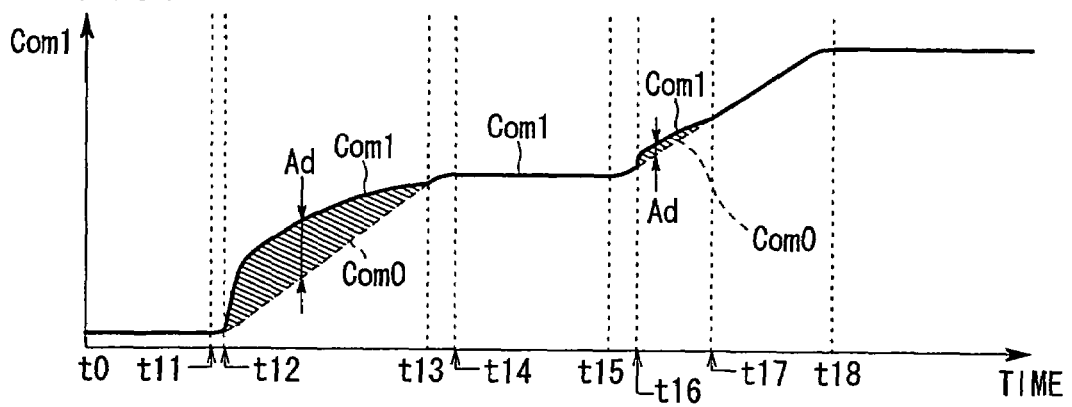
FIG. 11C is a time chart for the corrected output command value.
Figure 11D:
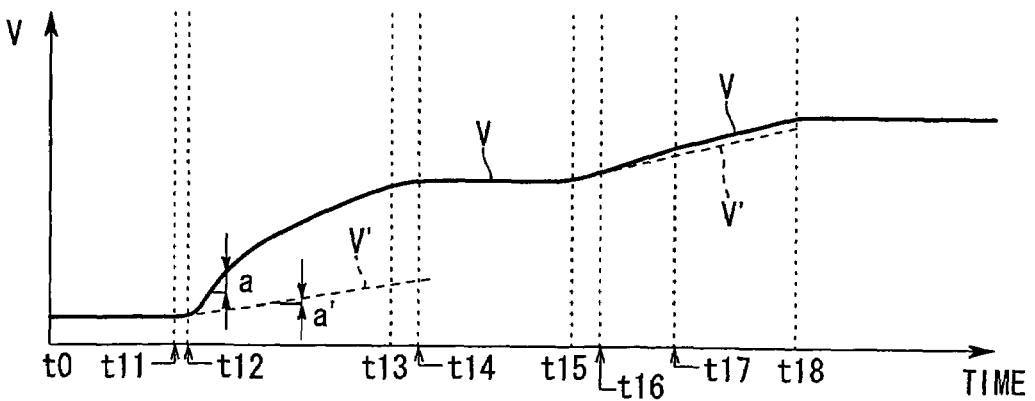
FIG. 11D is a time chart for the vehicle speed.

As the hatching in FIG. 11B indicates, $\Delta$Acc-X is the largest just after time t12 and after that, it becomes smaller gradually and reaches 0 at time t13. It is very small from time t16 to t17. As shown in FIG. 1C, the additional value Ad shows a tendency which corresponds to $\Delta$Acc-X.

At step S6, the output correcting part 184 calculates a corrected output command value Com1 by adding the additional value Ad supplied from the additional value decision part 188 to the output command reference value Com0 supplied from the motor output decision part 180. In this case, the corrected output command value Com1 is larger than the output command reference value Com0 from time t12 to t13 and from time t16 to t17 and they are equal in the other time zones, as shown in FIG. 1C.

Also, the corrected output command value Com1 is far larger than the output command reference value Com0 just after time t12 and after that, their difference (i.e. additional value Ad) becomes smaller and they coincide at time t13. Between time t16 and t17, the difference between the corrected output command value Com1 and the output command reference value Com0 is small.

At step S6, if the corrected output command value Com1 is beyond a command value input range for the drive motor 34, as a matter of course the corrected output command value Com1 is limited to a value within the command value input range.

At step S7, the corrected output command value Com1 is supplied as a torque command value to the drive motor 34. This enables the drive motor 34 to generate a torque corresponding to the corrected output command value Com1 to drive the rear wheel WR so that the hybrid vehicle 10 runs at vehicle speed V as shown in FIG. 1D.

In this case, acceleration speed (namely, gradient of vehicle speed V) "a" is particularly high just after time t12 and then as vehicle speed V increases, it decreases gradually. If the additional value Ad corresponding to the rate of change $\Delta$Acc should not be added to the output command reference value Com0, the hybrid vehicle 10 would run at vehicle speed V' which corresponds to the output command reference value Com0 and acceleration speed "a'" would be an almost constant small value. On the other hand, in the power control unit 150, since the corrected output command value Com1 as calculated by adding the additional value Ad to the output command reference value Com0 is supplied to the drive motor 34, a high acceleration speed "a" is obtained and vehicle speed V is much higher than vehicle speed V'.

From time t15 onward when the vehicle speed is relatively high, the additional value Ad is held small by the threshold X and vehicle speed V and vehicle speed V' show an almost equal tendency and particularly from time t17 onward, the acceleration speed is the same.

Generally speaking, when there is a sudden accelerator operation while the vehicle is running at low speed, it can be assumed that the rider intends to accelerate the vehicle quickly. The power control unit 150 makes it possible that when the vehicle is running at low speed and the rate of change $\Delta$Acc in the amount of accelerator operation Acc is large, an adequately large acceleration speed is obtained and the running performance as intended by the rider is achieved.

In addition, as shown in FIG. 11A and FIG. 11B, when change in the amount of accelerator operation Acc' is gradual, the corresponding the rate of change $\Delta$Acc' is below a threshold X' at the time concerned and the additional value Ad is 0 (Ad=0). Hence, the corrected output command value Com1 is equal to the output command reference value Com0 and acceleration speed "a" is suppressed and a normal driving feeling is maintained.

Thus, in the power control unit 150 according to this embodiment, the output command reference value Com0 as a reference value for a command to the drive motor 34 is calculated from the assist map 190 and the additional value Ad which corresponds to the rate of change $\Delta$Acc in the amount of accelerator operation Acc is added to the output command reference value Com0 to the calculate corrected output command value Com1. The drive motor 34 is controlled based on this corrected output command value Com1 so that the engine 32 is assisted in its output to obtain an adequate acceleration speed which responds to the rider's operation of the accelerator.

In this case, the concept of "control mode" for controlling the drive motor 34 does not exist and the rider need not have knowledge about control mode characteristics nor do control mode selection operation, so that he/she can drive easily. The power control unit 150 does not require any switch for control mode selection and can be configured simply. It is needless to say that the abovementioned "driving modes" concern the EV driving mode, engine driving mode and hybrid driving mode and are different in nature from the "control mode" for controlling the drive motor 34.

The above explanation assumes that the throttle target opening degree Th is set based on the amount of accelerator operation Acc, and the amount of accelerator operation Acc and the throttle target opening degree Th do not agree in a strict sense but show almost the same tendency. Hence, in the drive motor control part 174, an output command reference value Com0, a corrected output command value Com1 and an additional value Ad may be set based on throttle target opening degree Th instead of the amount of accelerator operation Acc.

Of functions provided in the power control unit 150, functions which switch the running mode by a simple structure and control and suppress occurrence of connecting noise accompanying switching of the driving mode will be described. FIG. 12 is a block diagram which is selectively shown for getting across such functions in functions provided in the ECU 158.

As shown in FIG. 12, the ECU 158 includes: a mode control part 170 which decides a driving mode according to the running condition judged based on the remaining amount of electric power SOC, vehicle speed V, the amount of accelerator operation Acc and the like; a starter motor control part 172 which decides a start timing of the engine 32 based on the driving mode and the like and gives the first inverter 153 a command to start the starter motor 36; and a motor torque calculating part 274 which calculates the drive torque of the drive motor 34 based on the vehicle speed V and the amount of accelerator operation Acc. The ECU 158 further includes: an injector control part 176 which sets the volume and timing of fuel injection by an injector 74 based on the number of rotations of the engine N0; a clutch engagement decision part 278 which judges the engagement status of the centrifugal clutch 40 and the one-way clutch 44 based on the number of rotations of the engine N0, the number of intermediate rotations Nc, input rotation speed Ni and output rotation speed No; and a target opening degree calculating part 279 which calculates a throttle target opening degree Th based on the amount of accelerator operation Acc and supplies it to the DBW 156. The clutch engagement decision part 278 calculates the vehicle speed V based on the output rotation speed No.

The driving modes which are selected by the mode control part 170 include: an EV driving mode (or electric driving mode) in which the vehicle runs by a driving force of the drive motor 34 only; an engine driving mode in which it runs by a driving force of the engine 32 only; and a hybrid driving mode in which both the drive motor 34 and the engine 32 are driven for it to run. Among them, the EV driving mode is selected when the remaining amount of electric power SOC is large and the running load is small, and the engine driving mode is selected when the remaining amount of electric power SOC is small or the running load is large. The hybrid driving mode is selected when the remaining amount of electric power SOC is large, the load is high and it is necessary for the drive motor 34 to assist the engine 32 or when output of the engine 32 should be decreased to reduce fuel consumption. The mode control part 170 gives the starter motor control part 172, motor torque calculating part 274 and injector control part 176 a given operation command depending on the selected driving mode.

The clutch engagement decision part 278 includes: a centrifugal clutch speed difference calculating part 280 which calculates a speed difference $\Delta N0$ between the number of rotations of the engine $N0$ and the number of intermediate rotations $Nc$; a one-way clutch speed difference calculating part 282 which calculates a speed difference $\Delta N1$ between the input rotation speed $Ni$ and the output rotation speed $No$; and a rate-of-change calculating part 284 which calculates the rate of change R in the speed difference $\Delta N1$. The rate-of-change calculating part 284 has a function of judging the engagement status of the one-way clutch 44 based on the speed difference $\Delta N1$, and upon completion of the engagement, transmits a signal X notifying thereof to the target opening degree calculating part 279.

The clutch engagement decision part 278 further includes: a threshold decision part 186 which compares the speed difference $\Delta N1$ with a threshold A; an engagement control time calculating part 288 which calculates an engagement control time Ts based on the rate of change R on the assumption that it is a control start time when the threshold decision part 186 detects that the speed difference $\Delta N1$ is below the threshold A; and a throttle rate-of-change calculating part 290 which calculates the amount of decrease in the throttle opening degree Q at the control start time.

The engagement control time calculating part 288 calculates an estimated engagement time for the one-way clutch 44 to engage, based on the rate of change R and sets somewhat longer time than the estimated engagement time, as an engagement control time Ts. Also, an estimated engagement time is calculated by reference to a lookup table based on the rate of change R or by a prescribed arithmetic formula. Under the influence of the power control unit 150 as stated later, the rate of increase in the number of rotations of the engine $N0$ is moderated from the control start time onward and the lookup table or formula is thus designed, taking this moderation of the increase rate into account, so that the estimated engagement time for the one-way clutch 44 to engage actually can be calculated accurately.

Figure 13:
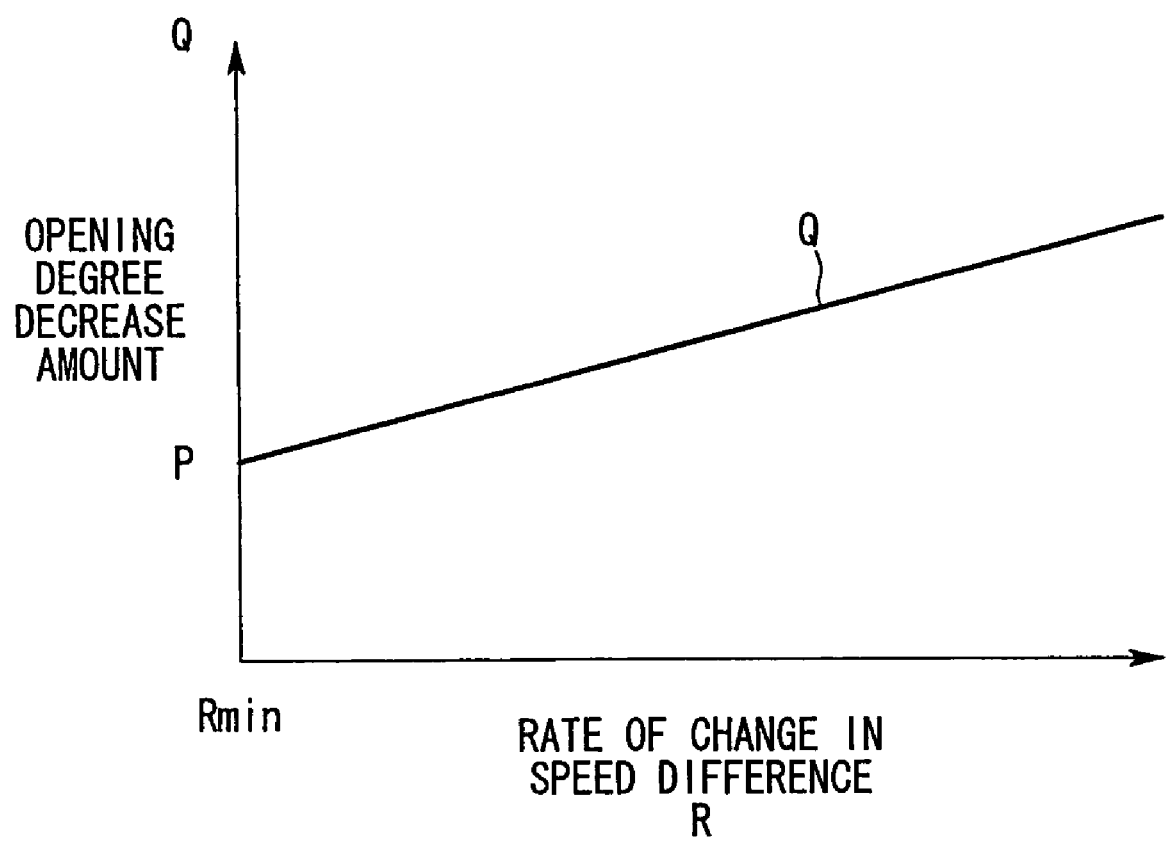
FIG. 13 is a graph showing the relation of opening degree decrease amount with respect to the rate of change in speed difference.

The throttle rate-of-change calculating part 290 increases the opening degree decrease amount Q as the rate of change R in the speed difference $\Delta N1$ increases. Specifically, as shown in FIG. 13, when the rate of change R is theoretical minimum Rmin, the opening degree decrease amount Q is set to an initial value P (P>0); and as the rate of change R increases, the opening degree decrease amount Q is set to a proportionally larger value. The engagement control time Ts and the opening degree decrease amount Q thus calculated by the clutch engagement decision part 278 are supplied to the target opening degree calculating part 279 at the control start time.

The target opening degree calculating part 279 calculates a reference value B for activating the throttle valve 72 based on the amount of accelerator operation Acc by reference to the value of negative pressure Pb supplied from the negative pressure sensor 73 and supplies the reference value B to the DBW 156, as a throttle target opening degree Th.

In the period until the engagement control time Ts has elapsed from the control start time or engagement of the one-way clutch 44 has been completed, the reference value B minus the opening degree decrease amount Q supplied from the clutch engagement decision part 278 is supplied as the throttle target opening degree Th to the DBW 156. In this period, the throttle target opening degree Th may be fixed at the throttle target opening degree Th initially calculated at the control start time or calculated in real time by subtracting the opening degree decrease amount Q from the current reference value B. In other words, when the target opening degree calculating part 279 receives the engagement control time Ts and the opening degree decrease amount Q from the clutch engagement decision part 278, it recognizes that it is the control start time and then until the engagement control time Ts has elapsed, it supplies the throttle target opening degree Th as a value smaller by the opening degree decrease amount Q than the reference value B, to the DBW 156. After elapse of the engagement control time Ts, the throttle target opening degree Th is reset to the reference value B.

The clutch engagement decision part 278 calculates the transmission gear ratio of the CVT 42 based on the number of intermediate rotations Nc and the input rotation speed Ni and supplies these data to the mode control part 170, etc.

The reference value B calculated by the target opening degree calculating part 279 should be basically proportional to the amount of accelerator operation Acc in the engine driving mode and corrected by negative pressure Pb obtained from the negative pressure sensor 73 and other parameters. In the EV driving mode, in which the engine 32 is stopped, the reference value B and the throttle target opening degree Th are 0. The reference value B and the throttle target opening degree Th may be expressed by the actual opening degree of the intake pipe path 71 or the inclination angle of the throttle valve 72 or the like. Since a parameter used for calculation of the reference value B and the throttle target opening degree Th should be appropriately selected according to the design of the hybrid vehicle 10, it need not be, for example, the negative pressure Pb. This means that the negative pressure sensor 73 can be omitted and the number of components can be decreased.

The ECU 158 has a CPU (Central Processing Unit) as a main controller, a RAM (Random Access Memory) and a ROM (Read Only Memory) as memories, and a driver and so on; the above functional parts are implemented when the CPU loads a program and performs software processing in cooperation with the memories, etc.

Next, how the power control unit 150 thus structured functions will be described referring to FIGS. 14 to 16D. An explanation given below assumes that the rider of the hybrid vehicle 10 operates the accelerator to increase the speed and the vehicle shifts from a low load run to a high load run while the battery 160 is sufficiently charged. For easy understanding, consideration will be given to two driving modes, the EV driving mode and the engine driving mode, and an explanation of another driving mode will be omitted. The processing sequence as shown in FIG. 14 is carried out at regular, very short time intervals successively mainly by the ECU 158 executing a program.

Figure 14:
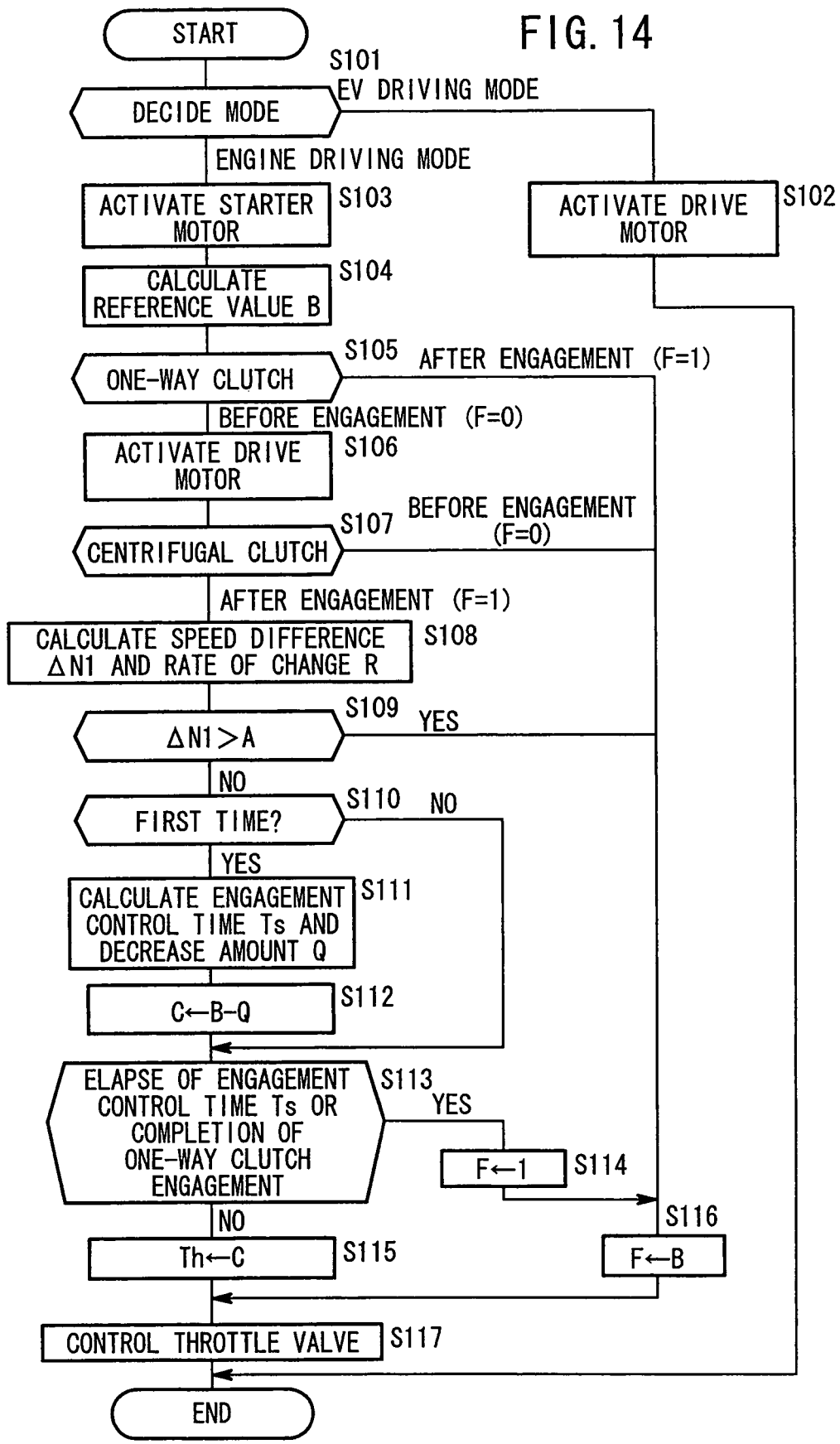
FIG. 14 is a flowchart showing the processing sequence which is performed by the power control unit for engagement of the one-way clutch.
Figure 15A:
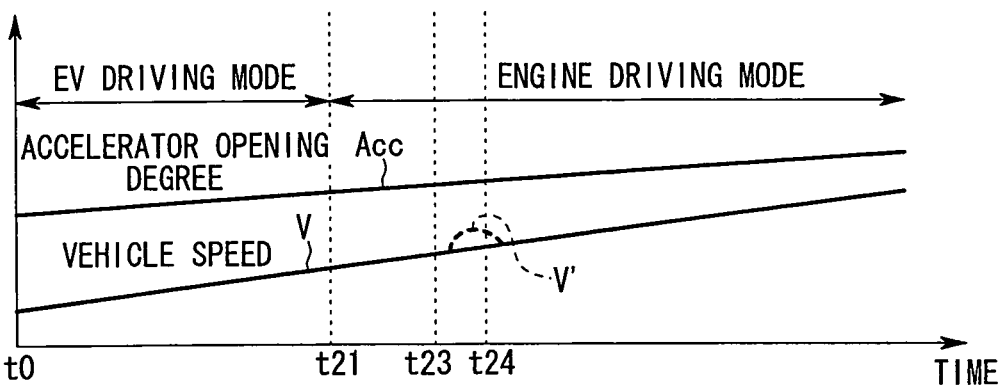
FIG. 15A is a time chart showing the vehicle speed and the amount of accelerator operation in slow acceleration.

First, at step S101 in FIG. 14, the mode control part 170 decides the current driving mode; when the running load is small, it selects the EV driving mode and goes to step S102 and when the running load is large, it selects the engine driving mode and goes to step S103. Concretely, reference is made to parameters such as the amount of accelerator operation Acc and the vehicle speed V, and as indicated in FIG. 15A, when the amount of accelerator operation Acc and the vehicle speed V are low, the running load is decided to be small and the EV driving mode is selected; when the amount of accelerator operation Acc and the vehicle speed V rise (time t21 in FIG. 15A), the engine driving mode is selected.

At step S102 (EV driving mode), the motor torque calculating part 274 calculates the required driving torque and activates the drive motor 34 through the second inverter 154. After the process at step S102, the processing sequence as shown in FIG. 14 is ended.

At step S103 (engine driving mode), the engine 32 is started by activating the starter motor 36 through the first inverter 153 under the influence of the starter motor control part 172. The process at step S103 is carried out just after the shift from the EV driving mode to the engine driving mode, and after the engine 32 is decided to have started by a given timer means or an engine start confirmation means, the starter motor 36 is stopped. After this, in the engine driving mode, the injector 74 is driven under the influence of the injector control part 176 so as to inject fuel appropriately according to the running condition or the number of rotations of the engine N0, etc.

At step S104, the target opening degree calculating part 279 calculates the reference value B based on the amount of accelerator operation Acc, etc.

At step S105, whether it is before or after engagement of the one-way clutch 44 is decided according to engagement decision flag F; if F=0, a decision is made that it is before the engagement and the sequence goes to step S106, and if F=1, a decision is made that it is after the engagement and the sequence goes to step S116. The engagement decision flag F is reset to 0 in the EV driving mode.

At step S106, the driving torque is calculated in the same way as at the above step S102 and the drive motor 34 is activated through the second inverter 154. In sum, in the engine driving mode as well, until the one-way clutch 44 is engaged, power of the engine 32 is not transmitted to the rear wheel WR and the vehicle continues to run by means of the drive motor 34 (see FIG. 15E).

At step S107 (before engagement of the one-way clutch), the centrifugal clutch speed difference calculating part 280 decides whether it is before or after engagement of the centrifugal clutch 40; and if a decision is made that it is before the engagement, the sequence goes to step S116 and if a decision is made that it is after the engagement, the sequence goes to step S108. When the speed difference ΔN0 between the number of rotations of the engine N0 and the number of intermediate rotations Nc is almost 0, the centrifugal clutch speed difference calculating part 280 can decide that the centrifugal clutch 40 is engaged.

Figure 15B:
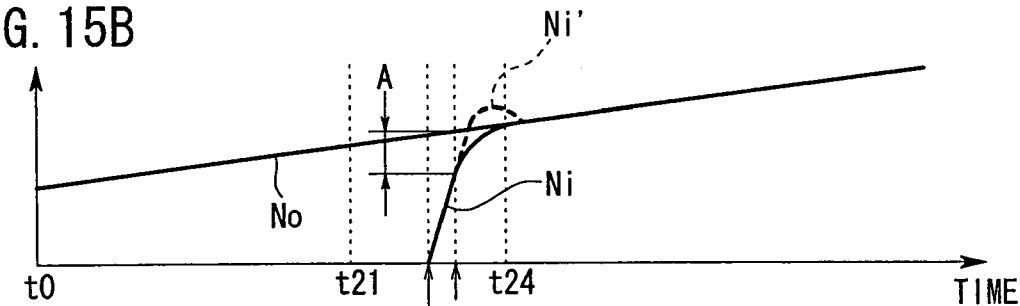
FIG. 15B is a time chart showing the output rotation speed and input rotation speed in slow acceleration.
Figure 15C:
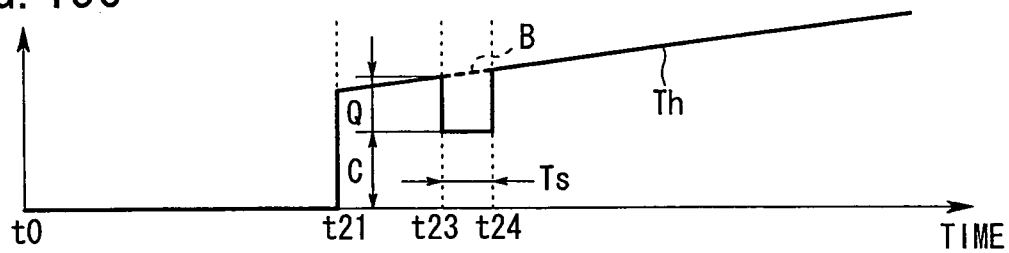
FIG. 15C is a time chart showing the target throttle opening degree in slow acceleration.

After time t22 when the centrifugal clutch 40 is engaged, the input rotation speed Ni goes up as shown in FIG. 15B.

At step S108 (after engagement of the centrifugal clutch), the one-way clutch speed difference calculating part 282 calculates the speed difference ΔN1 by subtracting the input rotation speed Ni from the output rotation speed No and the rate-of-change calculating part 284 calculates the rate of change R in the speed difference ΔN1.

At step S109, the threshold decision part 186 compares the speed difference ΔN1 with the threshold A; and if ΔN1>A, the sequence goes to step S116 and if ΔN1≦A, the sequence goes to step S110. Stated another way, if ΔN1>A, a decision is made that the one-way clutch 44 will remain not engaged for a while and the process under way is continued; and if ΔN1≦A, a decision is made that it is just before engagement of the one-way clutch 44 and the corresponding steps S110 to S115 are carried out.

At step S110, whether it is for the first time that the status of ΔN1>A has been changed to the status of ΔN1≦A is checked and if it is for the first time, namely control start time (time t23 in FIG. 15B), the sequence goes to step S111, and if it is for the second time or subsequent time, the sequence goes to step S113.

At step S111, the engagement control time calculating part 288 and the throttle rate-of-change calculating part 290 calculate the engagement control time Ts and the opening degree decrease amount Q based on the rate of change R and supplies them to the target opening degree calculating part 279.

At step S112, the target opening degree calculating part 279 calculates a control output buffer value C as calculated at step S104 by subtracting the opening degree decrease amount Q from the reference value B.

At step S113, whether the engagement control time Ts has elapsed from the control start time or not and the engagement status of the one-way clutch 44 are checked. If the engagement control time Ts has elapsed (time t24 in FIG. 14C), it is decided that the one-way clutch 44 is engaged and the engagement decision flag F is set to 1 (step S114) and the sequence goes to step S116. Also, when engagement of the one-way clutch 44 is completed, the engagement decision flag F is set to 1 (step S114) and the sequence goes to step S116. In short, the sequence goes to step S114 upon elapse of the engagement control time Ts or upon completion of engagement of the one-way clutch 44, whichever earlier. In other cases, or if the engagement control time Ts has not elapsed and the one-way clutch 44 is not engaged yet, the sequence goes to step S115.

The engagement status of the one-way clutch 44 is judged based on the speed difference ΔN1 between the input rotation speed Ni and the output rotation speed No; if ΔN1=0, it is decided that the clutch is engaged, and if ΔN1>0, it is decided that it is not engaged. In order to ensure that the decision about the engagement is made correctly, it is possible to decide that the engagement has been done when the status of ΔN1=0 has continued for a given time, or taking a measurement error into consideration, when a certain range of statuses which are not exactly ΔN1=0 but close to it have continued.

In this case, the engagement status of the one-way clutch 44 can be judged based on the input rotation speed Ni and the output rotation speed No, which obviously eliminates the need for a special additional detecting means. Whether or not the engagement of the one-way clutch 44 is completed can be decided according to the signal X transmitted from the rate-of-change calculating part 284.

At step S115, the throttle opening degree Th is set to C and then the sequence goes to step S117. In other words, during the engagement control time Ts and when the one-way clutch 44 is not engaged, the throttle target opening degree Th is smaller by the opening degree decrease amount Q than the reference value B. While the reference value B varies depending on the running condition, the control output buffer value C is fixed; however, the engagement control time Ts is short and variation in the reference value B is small during it. Therefore, the throttle target opening degree Th is smaller virtually by the opening degree decrease amount Q than the reference value B.

At step S116, the throttle target opening degree Th is set to B. In other words, in the period from a time t21 of shift to the engine driving mode to a control start time t23 and after elapse of the engagement control time Ts, or after completion of engagement of the one-way clutch 44, the reference value B calculated at step S102 is set as the throttle target opening degree Th.

At step S117, the throttle target opening degree Th set at step S115 or S116 is supplied to the DBW 156 and the DBW 156 controls so that the rotational angle of the throttle valve 72 becomes equal to the throttle target opening degree Th. After step S117, the sequence as shown in FIG. 14 is ended.

If ΔN1>A is decided at the above step S109, the engagement decision flag F may be reset to 0. If that is the case, after the one-way clutch 44 is temporarily disengaged depending on the running condition in the engine driving mode, steps S110 to S115 are carried out again when the one-way clutch is to be engaged again, so that engagement noise can be reduced.

Furthermore, at step S109, instead of a decision based on the speed difference ΔN1, a decision may be based on an estimated engagement time for the one-way clutch 44 calculated from the rate of change R in the speed difference ΔN1, etc. Specifically, it is also possible that when the estimated engagement time becomes below a prescribed threshold, a decision is made that it is a control start time and the sequence goes to step S110; when the estimated engagement time exceeds the prescribed threshold, the sequence goes to step S116. In this case, the engagement control time Ts cannot be too long and driving mode switching will be smooth. The estimated engagement time can be calculated, for example, by dividing the speed difference ΔN1 by the rate of change R.

As mentioned above, in the power control unit 150 according to this embodiment, the throttle target opening degree Th is smaller by the opening degree decrease amount Q than the reference value B in the period from control start time, just before engagement of the one-way clutch 44, through the engagement control time Ts and when the one-way clutch 44 is not engaged, so that output of the engine 32 is suppressed and the rate of increase in the number of rotations of the engine N0 is moderated.

Figure 15D:
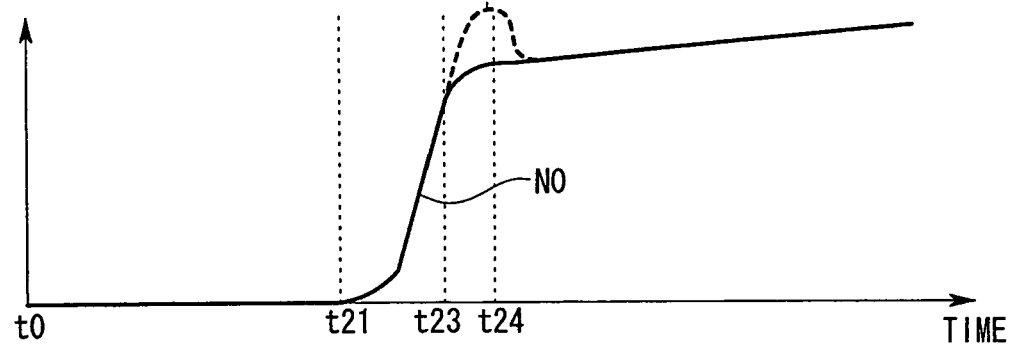
FIG. 15D is a time chart showing the number of rotations of the engine in slow acceleration.
Figure 15E:
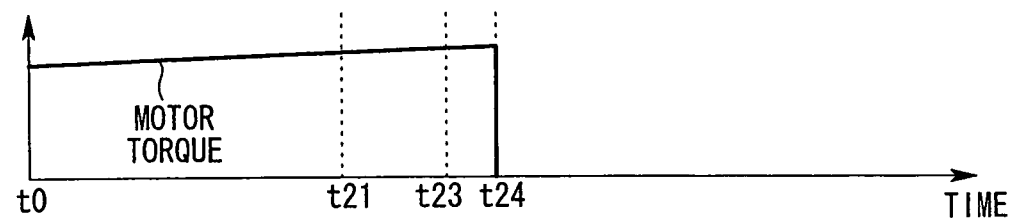
FIG. 15E is a time chart showing a motor torque command in slow acceleration.
Figure 16A:
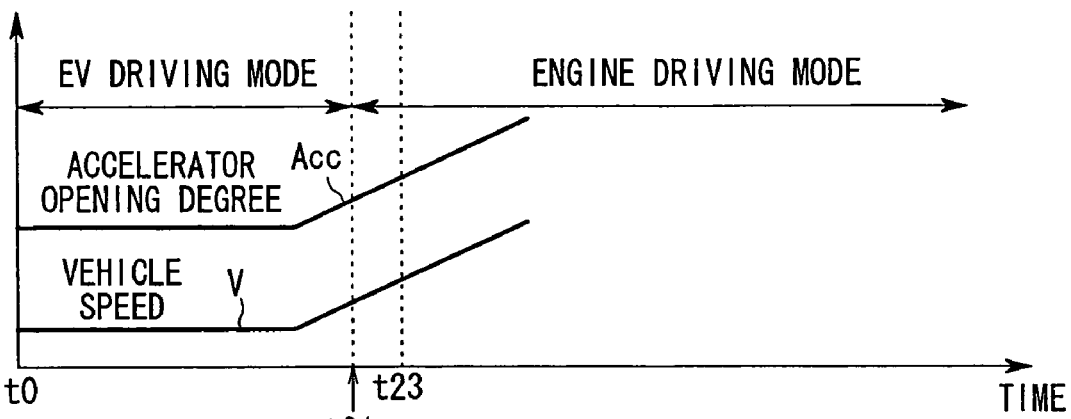
FIG. 16A is a time chart showing the vehicle speed and the amount of accelerator operation in quick acceleration.
Figure 16B:
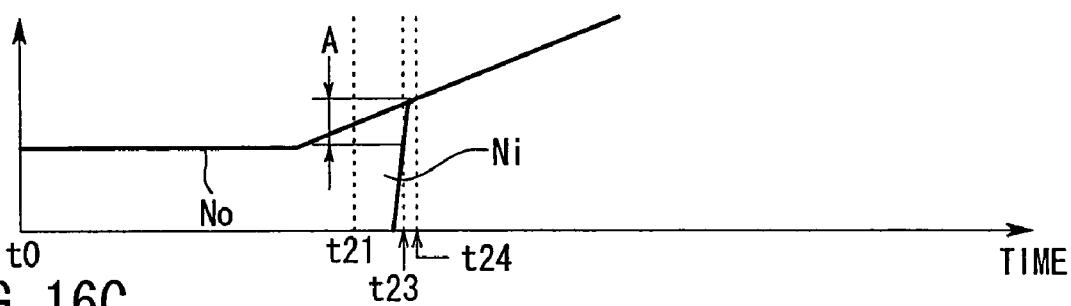
FIG. 16B is a time chart showing the output rotation speed and input rotation speed in quick acceleration.
Figure 16C:
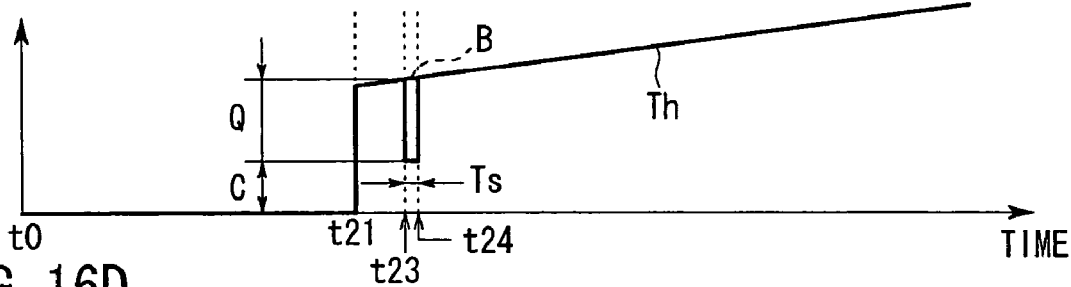
FIG. 16C is a time chart showing the target throttle opening degree in quick acceleration.
Figure 16D:
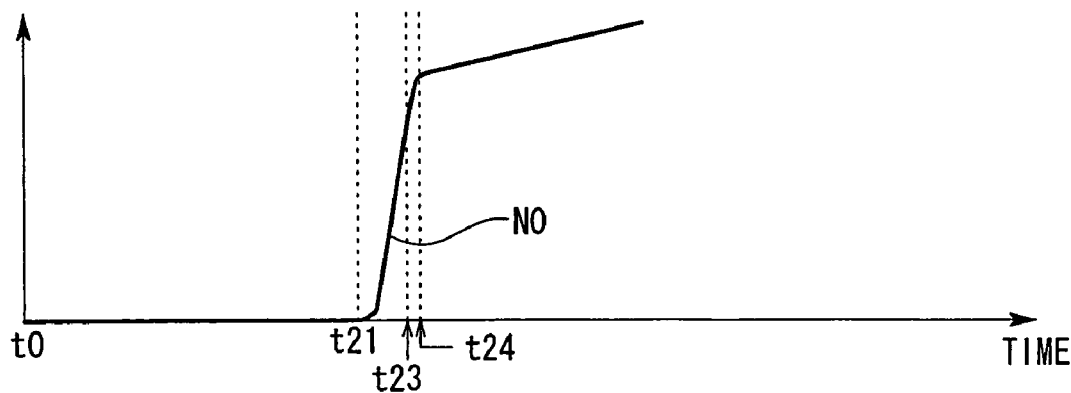
FIG. 16D is a time chart showing the number of rotations of the engine in quick acceleration.

If the throttle target opening degree Th should be set to a value equal to the reference value B during the engagement control time Ts and when the one-way clutch 44 is not engaged, as indicated by the hypothetical line in FIG. 15D which represents the number of rotations of the engine N0', the rate of increase would not be limited but a large overshoot would occur. In this case, the input rotation speed Ni would show the same tendency as the number of rotations of the engine N0' (input rotation speed Ni' in FIG. 15B) depending on the transmission gear ratio of the CVT 42 at that moment; and the inner clutch 44b and the outer clutch 44a of the one-way clutch 44 would be engaged while the rate of change R in the speed difference ΔN1 is large. Hence, output of the engine 32 would be suddenly transmitted to the rear wheel WR and some engagement noise would be momentarily generated (see vehicle speed V' in FIG. 15A).

By contrast, through the power control unit 150 according to this embodiment, when the one-way clutch 44 is engaged, output of the engine 32 is suppressed and the rate of increase in the number of rotations of the engine N0 is moderated, so that the rate of change R in the speed difference ΔN1 is small and the one-way clutch 44 is smoothly engaged. Hence, as indicated in FIGS. 15A and 15D, there will be virtually no overshoot in the number of rotations of the engine N0 and little change in the vehicle speed V and engagement noise generation will be suppressed sufficiently.

Furthermore, in the period from the time t21 of switching to the engine driving mode to the control start time t23, the reference value B is set as the throttle target opening degree Th and therefore the number of rotations of the engine N0 and the input rotation speed Ni rise in a short time and quick mode switching is possible, leading to improvement in so-called response performance.

Besides, after elapse of the engagement control time Ts or after completion of engagement of the one-way clutch 44, the throttle target opening degree Th is reset to a value equal to the reference value B so that a normal driving feeling is ensured.

On the other hand, as indicated in FIGS. 16A to 16D, in quick acceleration where the amount of accelerator operation Acc is changed quickly, the number of rotations of the engine N0 and the input rotation speed Ni increase quickly and accordingly the rate of change R in the speed difference ΔN1 becomes a large value. In this case, the engagement control time calculating part 288 sets the engagement control time Ts shorter and the throttle target opening degree Th decreases for a short time corresponding to the quick acceleration, so there is no chance of response performance deterioration. Also, as the rate of change R increases, the throttle rate-of-change calculating part 290 sets the opening degree decrease amount Q larger and therefore output of the engine 32 is suppressed sufficiently and the rate of change R becomes small before the one-way clutch 44 is engaged. Hence, even in quick acceleration, the one-way clutch 44 is engaged smoothly and engagement noise generation is suppressed and the vehicle speed V hardly changes.

In other words, since engagement noise generated by engagement of the one-way clutch 44 is considered to vary depending on the rate of change R, an adequate opening degree decrease amount Q can be set to reduce engagement noise, by processing according to the rate of change R calculated previously depending on the running condition. This allows sufficient engagement noise reduction and quick power switching without an excessive drop in output of the engine 32.

Since the power control unit 150 eliminates the need for a torque sensor on each of the input and output sides of the one-way clutch 44, an inexpensive configuration is possible and complicated control to make the input torque agree with the output torque is not needed. In addition, the centrifugal clutch 40 and the one-way clutch 44 used in the power control unit 150 are self-controlled clutches and unlike electromagnetic clutches, they do not require an actuator for engagement or any engagement control means.

Figure 17:
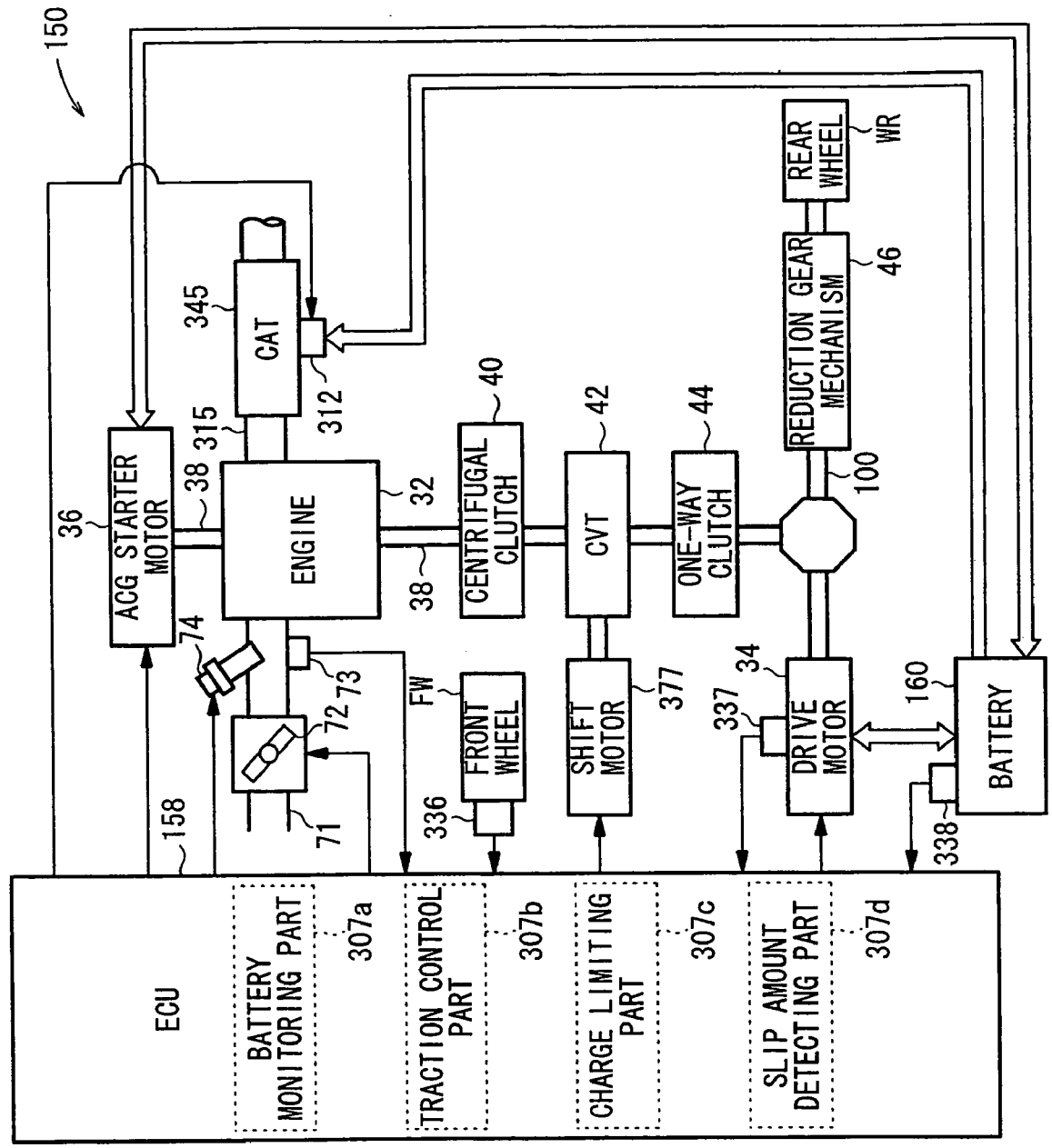
FIG. 17 is a block diagram of the functional configuration of the ECU which is selectively shown a function which eliminates slip with a simple structure.

Of functions provided in the power control unit 150, a function which eliminates slip with a simple structure will be described. FIG. 17 is a block diagram which is selectively shown for getting across such function out of the functions provided in the ECU 158.

As shown in FIG. 17, the power control unit 150 includes: an engine 32; a starter motor 36 which functions as an engine starter and a generator; a CVT (power transmission means) 42, coupled with a crankshaft 38, which transmits power of the engine 32 to the rear wheel WR; a shift motor 377 which changes the transmission gear ratio of the CVT 42; a centrifugal clutch 40 which connects and disconnects power transmission between the crankshaft 38 and the input shaft of the CVT 42; a drive motor 34 which functions as an electric motor or generator; a one-way clutch 344 which transmits power of the engine 32 and drive motor 34 through a drive shaft 100 to the rear wheel WR but does not transmit power from the rear wheel WR to the engine 32; and a reduction gear mechanism 46 which decelerates output of the drive shaft 100 and transmits it to the rear wheel WR. Power of the engine 32 is transmitted from the crankshaft 38 through the centrifugal clutch 40, CVT 42, one-way clutch 344, drive shaft 100 and reduction gear mechanism 46 to the rear wheel WR. On the other hand, power from the drive motor 34 is transmitted through the drive shaft 100 and reduction gear mechanism 46 to the rear wheel WR.

The starter motor 36 and drive motor 34 are connected with a battery 160. This battery 160 is designed so that when the drive motor 34 functions as an electric motor and when the starter motor 36 functions as a starter, it supplies driving energy to these motors 36 and 34, and when the starter motor 36 and drive motor 34 function as generators, it is charged with electric energy generated by them.

A throttle valve 72 which controls the volume of air is rotatably fitted inside an intake pass 71 of the engine 32. This throttle valve 72 rotates according to the amount of operation of a throttle grip (not shown) which the rider operates. An injector 74 which injects fuel and a negative pressure sensor 73 which detects negative pressure in the intake pass 71 are provided between the throttle valve 72 and engine 32. A catalyzer 345 is fitted on an exhaust pipe 315 of the engine 32. On the catalyzer 345, a heater 312 for activating it is fitted.

The rotational speed of the front wheel FW is detected by a rotational speed sensor 336. The rotational speed of the drive motor 34 is detected by a rotational speed sensor 337. The terminal voltage and/or charge and discharge current of the battery 160 are detected by a battery sensor 338.

In the ECU 158, a slip detecting part 307*d* detects the amount of slip R based on the difference or ratio between rotational speed Nf of the front wheel FW detected by the sensor 336 and rotational speed Nr of the rear wheel RW calculated from the rotational speed of the drive motor 34 detected by the sensor 337 and the reduction ratio of the reduction gear mechanism 46. A battery monitoring part 307*a* monitors the remaining capacity of the battery 160 based on the result of detection by the battery sensor 338. A traction control part 307*b* controls the starter motor 36 and the drive motor 34 to eliminate slip when the detected amount of slip R exceeds a prescribed level. A charge limiting part 307*c* makes a catalyzer heater 312 consume electric energy outputted from the starter motor 36 or the drive motor 34 when the remaining capacity of the battery is sufficient.

Figure 18:
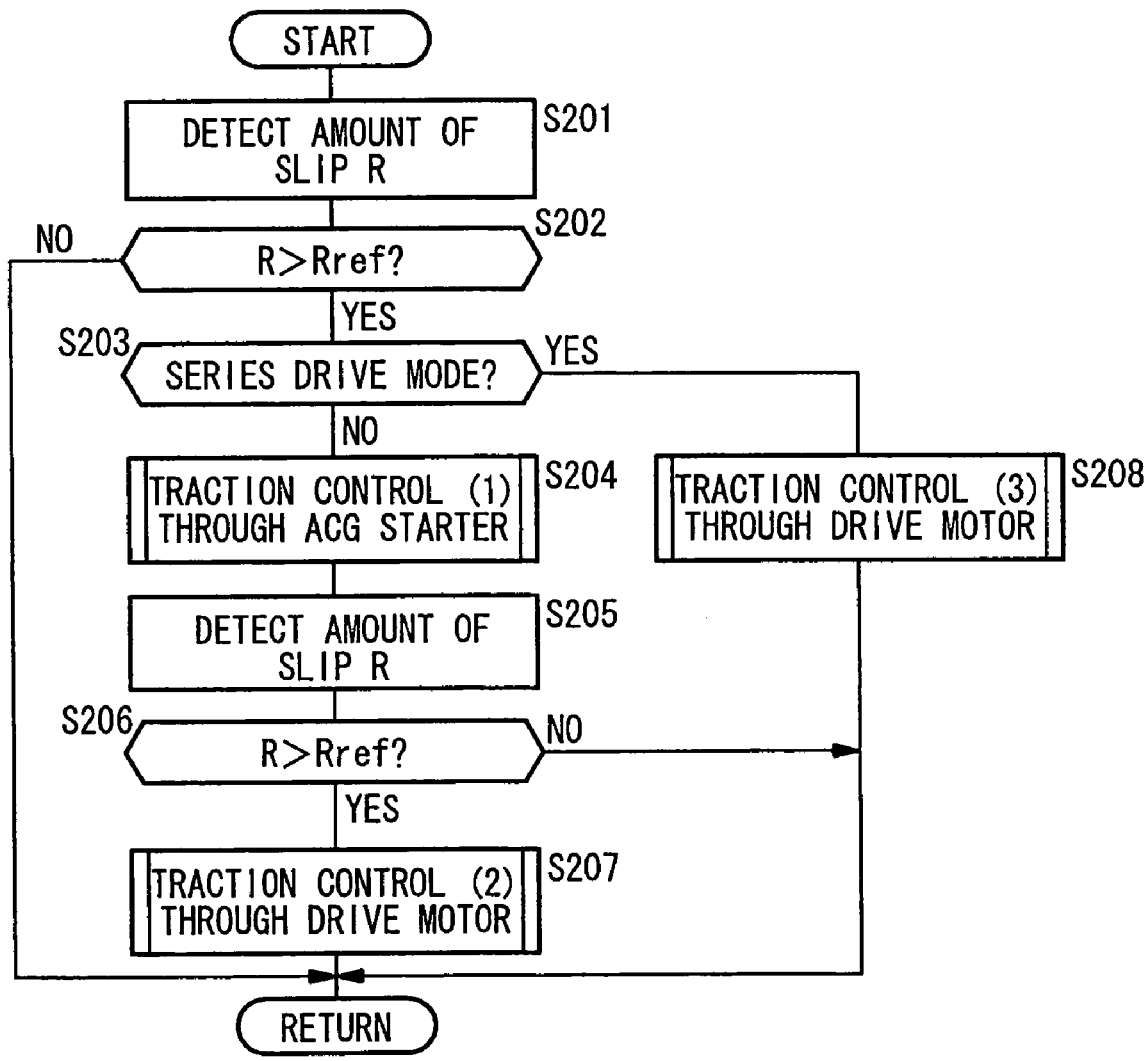
FIG. 18 is a flowchart showing the traction control sequence.

FIG. 18 is a flowchart showing the traction control sequence which is performed by the abovementioned traction control part 307*b*.

At step S201, the slip amount detecting part 307*d* detects the amount of slip R. At step S202, the detected amount of slip R is compared with an allowable amount of slip Rref. The allowable amount of slip Rref is previously set at an adequate value which allows efficient power transmission from the driving wheel to the road surface and if the amount of slip R is in excess of the allowable amount of slip Rref, the amount of slip R is decided to be too large and the sequence goes to step S203. At step S203, a decision is made as to whether the vehicle is in the series drive mode where the engine 32 makes the starter motor 36 generate electric energy and the electric current generated by the starter motor 36 is used to activate the drive motor 34. Except in the series drive mode, namely when the vehicle is driven by power of the engine 32, the sequence goes to step S204. At step S204, traction control (1) is performed as follows: the electric energy generated by the starter motor 36 is increased to give load to the engine 32 and thereby lowering the driving force to eliminate slip.

Figure 19:
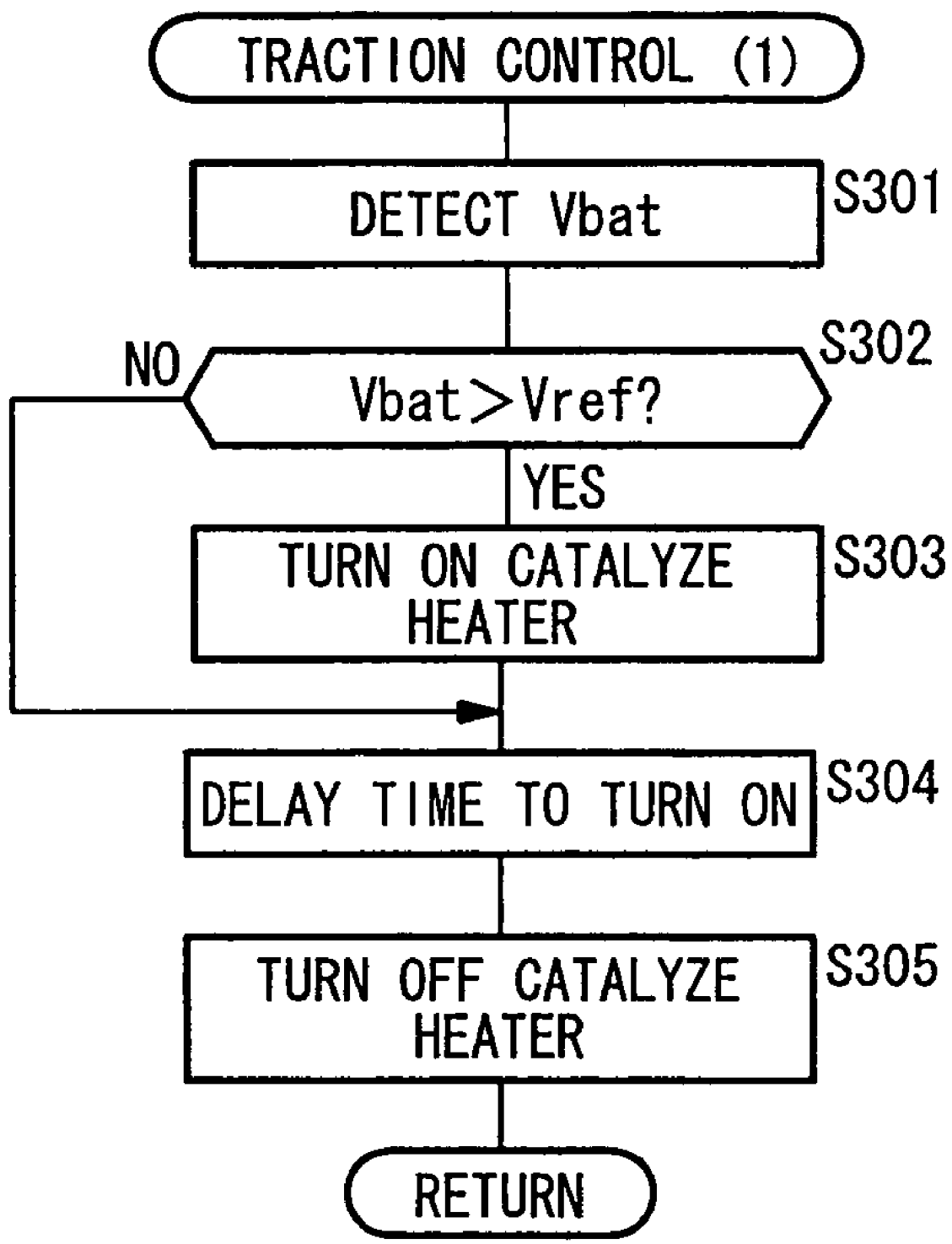
FIG. 19 is a flowchart showing traction control through the ACG starter.

FIG. 19 shows the procedure of traction control (1) which is performed at step S204: at step S301, the battery monitoring part 307*a* detects the remaining capacity Vbat of the battery 160. At step S302, the remaining capacity Vbat is compared with an overcharge threshold Vref. If the remaining capacity Vbat is in excess of the overcharge threshold Vref, the sequence goes to step S303 to let the generated energy be consumed by something other than battery charging. At step S303, the charge limiting part 307*c* turns on the heater 312 to activate the catalyzer 345. At step S304, the time to turn on the starter motor 36 is temporarily delayed according to the amount of slip R and the electric energy generated by the starter motor 36 is increased by magnetization to increase the load on the engine. Since the electric energy generated by the starter motor 36 is consumed by the heater 312 of the catalyzer 345, even when the battery 160 is fully charged, a sufficient regenerative braking force can be generated by the starter motor 36. At step S305, the heater 312 is turned off synchronously with the end of the temporary regenerative energy generation.

Figure 22A:
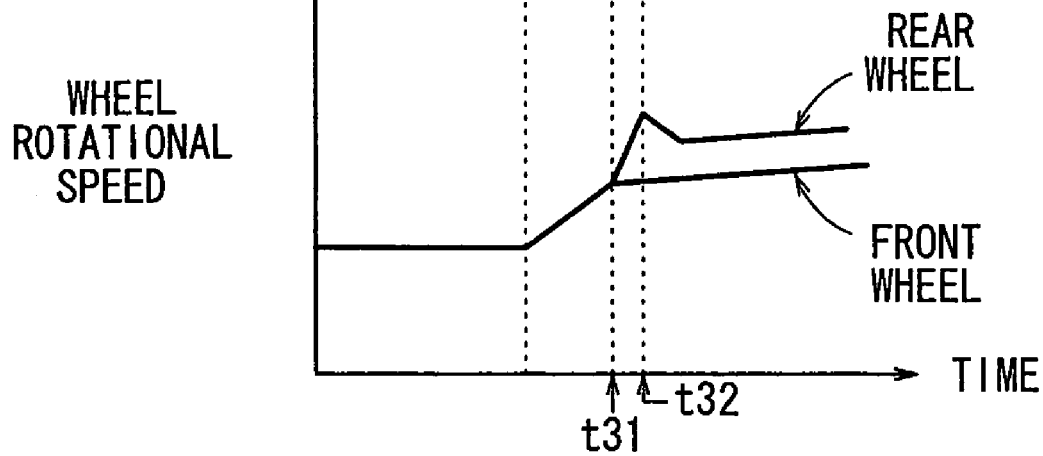
FIG. 22A is a timing chart of wheel rotating speed for traction control through the ACG starter.
Figure 22B:
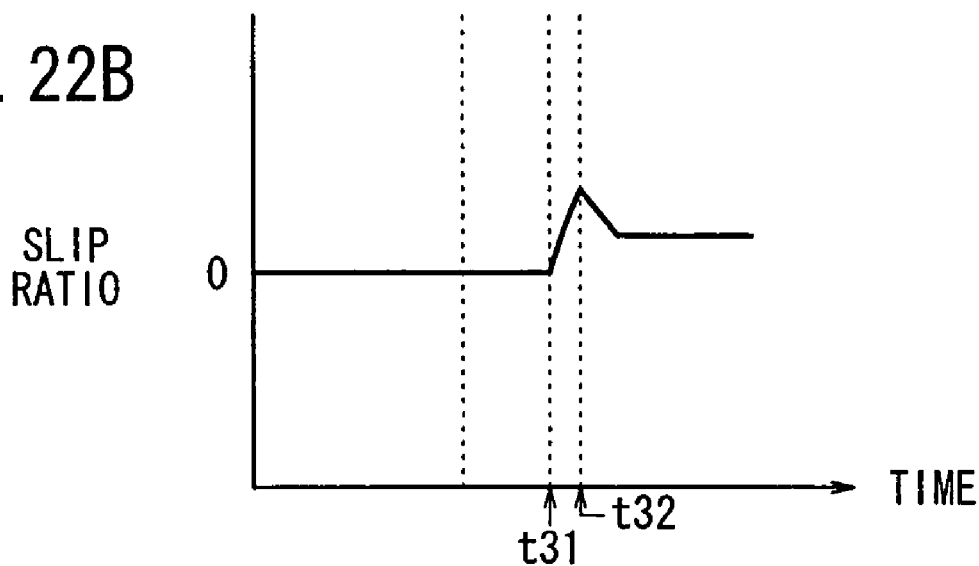
FIG. 22B is a timing chart of a slip ratio for traction control through the ACG starter.
Figure 22C:
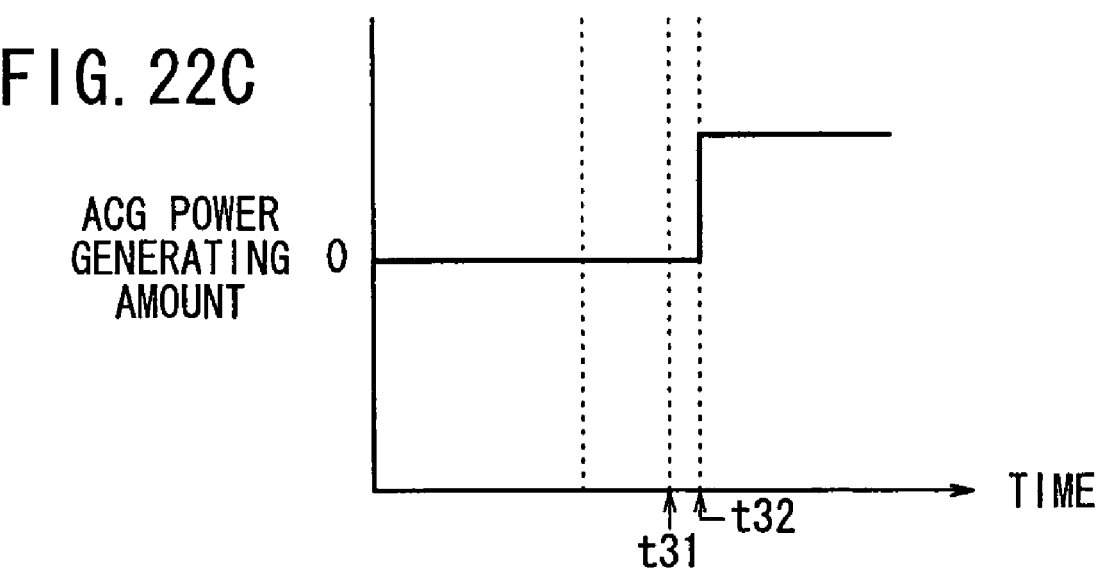
FIG. 22C is a timing chart of an ACG power generating amount for traction control through the ACG starter.
Figure 23A:
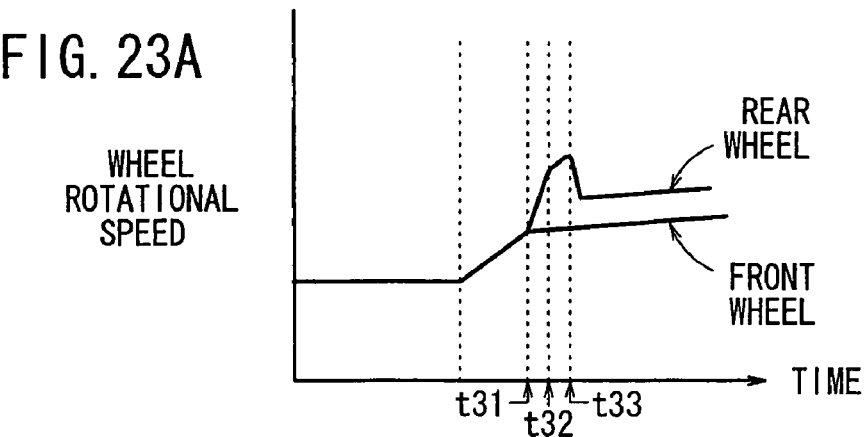
FIG. 23A is a timing chart of wheel rotating speed for traction control through the drive motor.
Figure 23B:
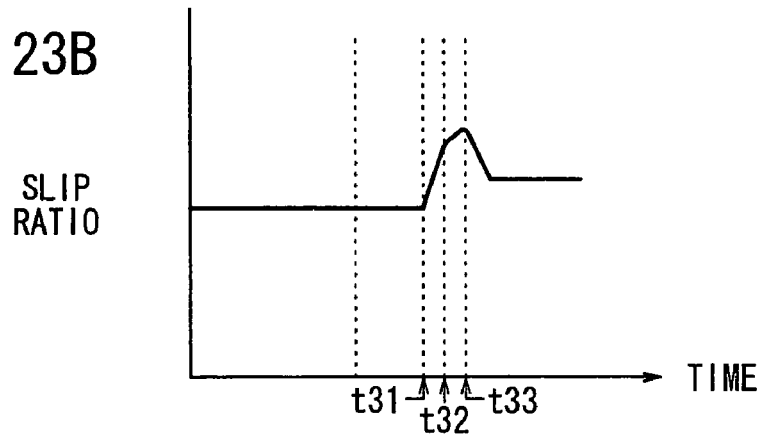
FIG. 23B is a timing chart of a slip ratio for traction control through the drive motor.
Figure 23C:
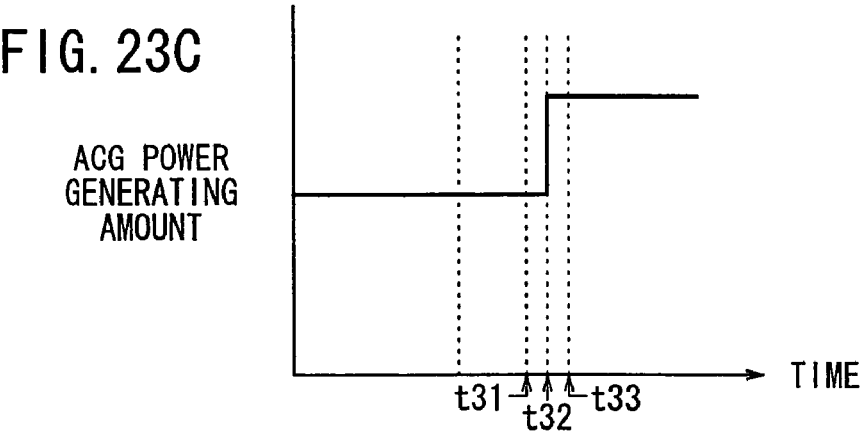
FIG. 23C is a timing chart of an ACG power generating amount for traction control through the drive motor.
Figure 23D:
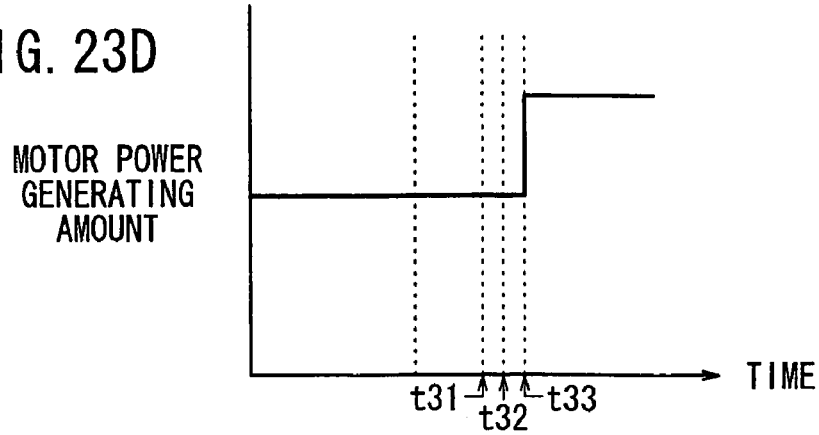
FIG. 23D is a timing chart of a motor power generating amount for traction control through the drive motor.

FIG. 22A and FIG. 22B are timing charts for traction control (1) which is performed at step S204: slip begins at time t31, the amount of slip R exceeds the allowable amount of slip Rref at time t32, and when this is detected at step S202, traction control (1) as shown in FIG. 19 begins. At step S304, the time to turn on the starter motor 36 is temporarily delayed and the load on the engine increases and the driving force to the rear wheel RW decreases to eliminate slip.

Back to FIG. 18, at step S205, the amount of slip R is detected again and at step S206, a decision is made as to whether the amount of slip R is too large or not, in the same way as mentioned above. If the amount of slip R is decided to be still too large, the sequence goes to step S207 and traction control (2) through the drive motor 34 is performed.

Figure 20:
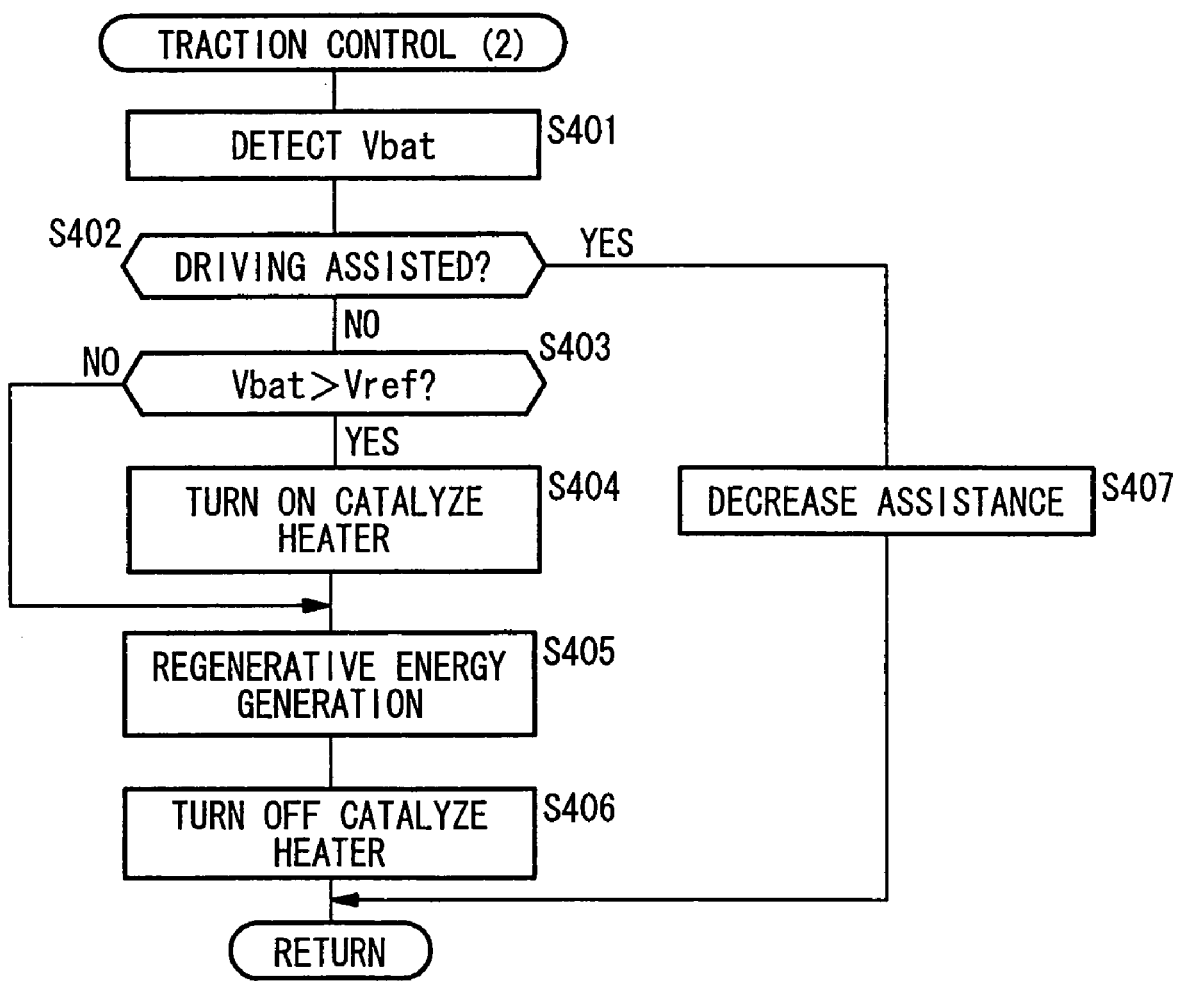
FIG. 20 is a flowchart showing traction control through the drive motor.

FIG. 20 shows the procedure of traction control (2) which is performed at step S207: at step S401, the remaining capacity Vbat of the battery 160 is detected and at step S402, a decision is made as to whether the drive motor 34 is assisting driving or not. If it is not assisting driving, the sequence goes to step S403 and the remaining capacity Vbat is compared with the overcharge threshold Vref. If the remaining capacity Vbat is in excess of the overcharge threshold Vref, the sequence goes to step S404 to let the generated energy be consumed by something other than battery charging.

At step S404, the heater 312 for activating the catalyzer 345 is biased. At step S405, the drive motor 34 functions as a generator temporarily and the resulting regenerative braking force is used to increase the load on the engine. Regenerative energy is consumed by the heater 312 of the catalyzer 345. At step S406, the heater 312 is turned off synchronously with the end of the temporary regenerative energy generation. On the other hand, if it is decided at step S402 that the drive motor 34 is assisting driving, the sequence goes to step S407 and the amount of assistance by the drive motor 34 is decreased depending on the amount of slip R.

FIGS. 23A to 23D are timing charts for traction control (2) which is performed at step S207: if slip is not eliminated though the first traction control (1) has been performed at the time t32, traction control (2) as shown above in FIG. 20 is started at time t33. When the drive motor 34 functions as a generator at step S405 or the amount of assistance by the drive motor 34 is decreased at step S407, the driving force of the rear wheel RW decreases and slip is thus eliminated.

Back to FIG. 18, if it is decided at step S203 that the vehicle is in the series drive mode, the sequence goes to step S208 and traction control (3) through the drive motor 34 is performed.

Figure 21:
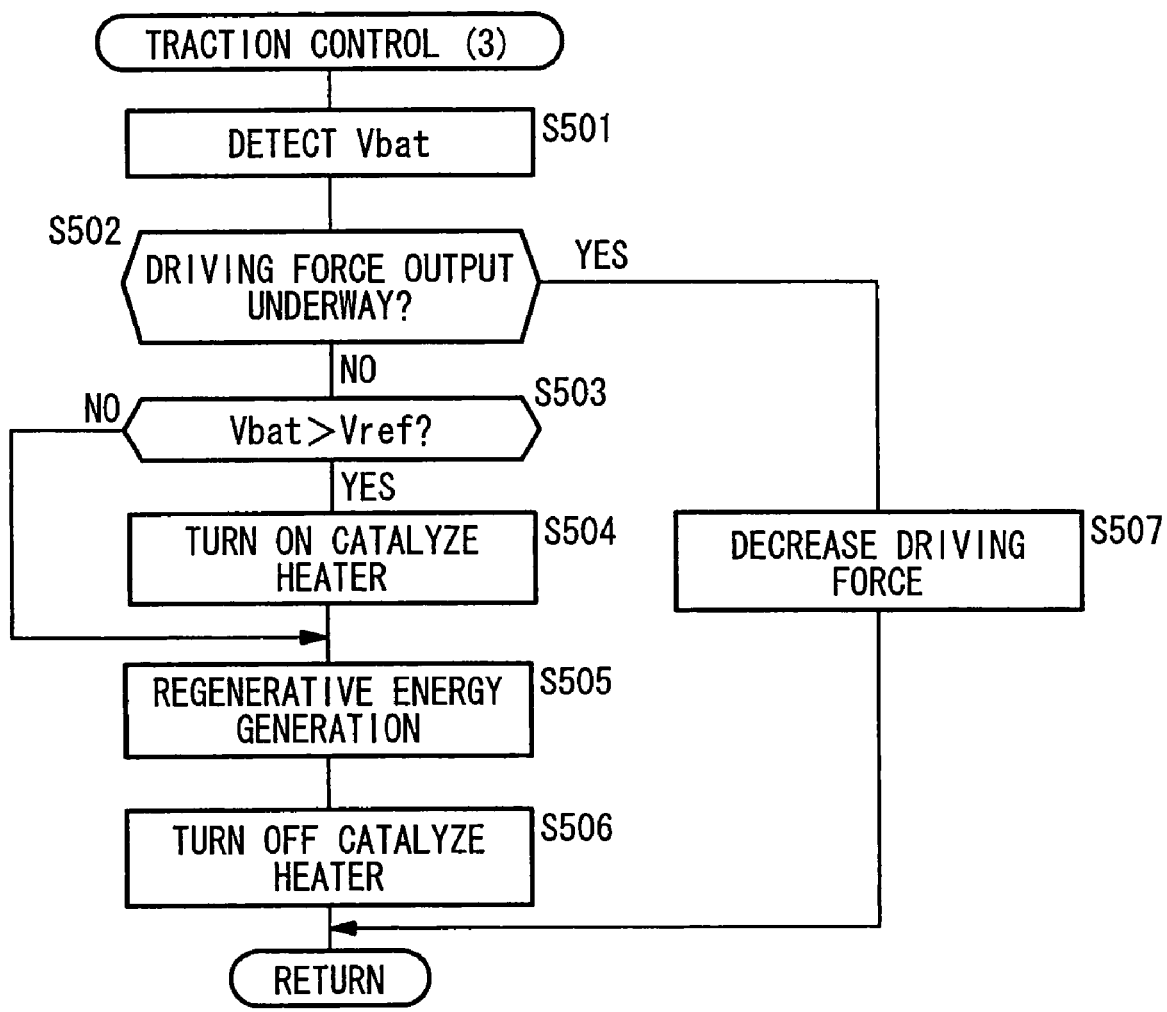
FIG. 21 is a flowchart showing traction control through the drive motor in the series hybrid drive mode.

FIG. 21 shows the procedure of traction control (3) which is performed at step S208: at step S501, the remaining capacity Vbat of the battery 160 is detected and at step S502, a decision is made as to whether the drive motor 34 is outputting a driving force or not. If the drive motor 34 is not outputting a driving force and the vehicle is free-wheeling or regenerative braking is underway, the sequence goes to step S503 and the remaining capacity Vbat is compared with an overcharge threshold Vref. If the remaining capacity Vbat is in excess of the overcharge threshold Vref, the sequence goes to step S404 to let the generated energy be consumed by something other than battery charging.

At step S504, the heater 312 for activating the catalyzer 345 is biased. At step S505, the time to turn on the drive motor 34 is temporarily delayed depending on the amount of slip R and the electric energy generated by the drive motor 34 is increased by magnetization to increase the load on the engine. The regenerative energy is consumed by the heater 312 of the catalyzer 345. At step S506, the heater 312 is turned off synchronously with the end of the temporary regenerative energy generation. On the other hand, if it is decided at step S502 that the drive motor 34 is outputting a driving force, the sequence goes to step S507 and the driving force of the drive motor 34 is decreased depending on the amount of slip R.

Figure 24A:
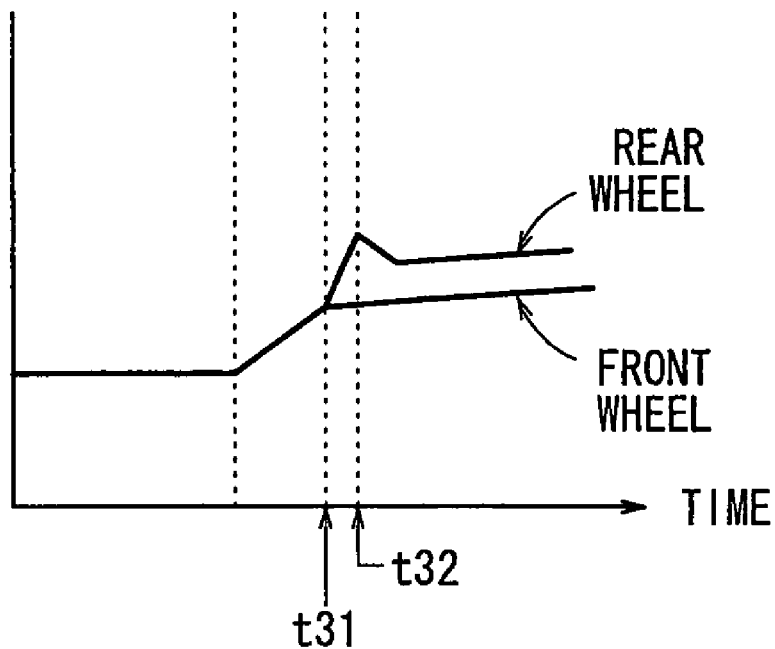
FIG. 24A is a timing chart of wheel rotating speed showing traction control through the drive motor in the series hybrid drive mode.
Figure 24B:
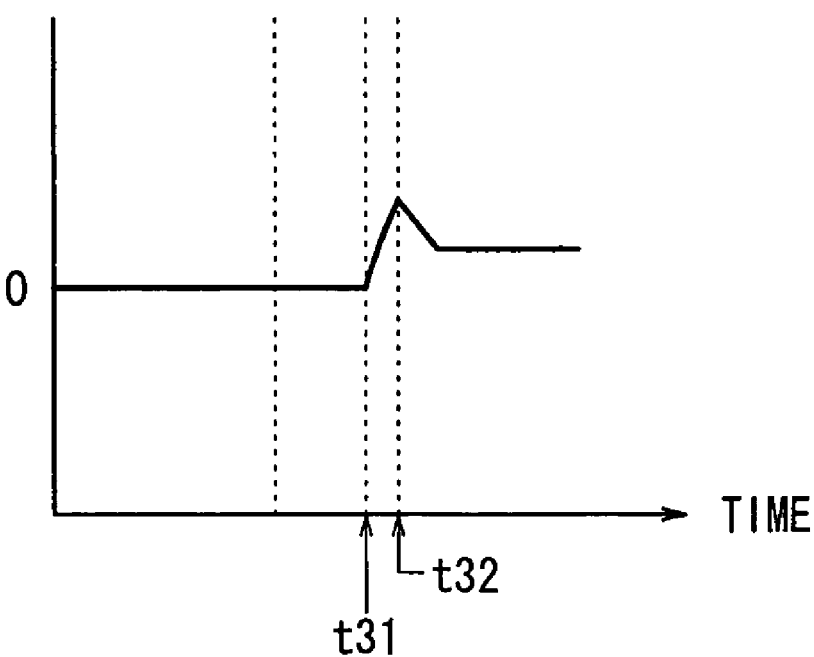
FIG. 24B is a timing chart of a slip ratio showing traction control through the drive motor in the series hybrid drive mode.

FIG. 24 is a timing chart for traction control (3) which is performed at step S208: slip begins at time t31 and the amount of slip R exceeds the allowable amount of slip Rfef at time t32 and when this is detected at step S202, traction control (3) as shown in FIG. 21 begins. When the drive motor 34 functions as a generator at step S505 or the driving force of the drive motor 34 is decreased at step S507, the driving force of the rear wheel RW decreases and slip is thus eliminated.

Although certain preferred embodiments of the present invention have been shown and described in detail, it should be understood that various changes and modifications may be made therein without departing from the scope of the appended claims.

What is claimed is:

1. A power control unit in a hybrid vehicle comprising:
   an engine and a drive motor which generate a driving force for running;
   a vehicle speed sensor which detects a vehicle speed;
   an accelerator sensor which detects an amount of accelerator operation; and
   a control part having a reference value setting part which determines an output command reference value for said drive motor based on said vehicle speed supplied from said vehicle speed sensor and said amount of accelerator operation supplied from said accelerator sensor, characterized in that:
   said control part outputs, to said drive motor, a corrected output command value obtained by adding an additional value corresponding to a rate of change in said amount of accelerator operation to said output command reference value obtained from said reference value setting part.

2. The power control unit as described in claim 1, characterized in that said control part adds said additional value to said output command reference value and outputs said corrected output command value when said rate of change in said amount of accelerator operation exceeds a threshold.

3. The power control unit as described in claim 2, characterized in that said control part makes said additional value 0 when said rate of change in said amount of accelerator operation is below said threshold.

4. The power control unit as described in claim 2, characterized in that said control part changes said threshold based on said vehicle speed.

5. The power control unit as described in claim 4, characterized in that said control part increases said threshold as said vehicle speed increases.

6. The power control unit as described in claim 1, characterized in that said the power control unit comprising:
   a one-way clutch with an input side connected with said engine and an output side connected with said drive motor;
   a throttle valve which regulates the throttle opening degree under the influence of a throttle motor;
   an input rotation sensor which detects the input rotation speed of said one-way clutch and supplies it to said control part; and
   an output rotation sensor which detects the output rotation speed of said one-way clutch and supplies it to said control part,
   wherein said control part reads said amount of accelerator operation from said accelerator sensor, calculates a target opening degree for said throttle opening degree based on said amount of accelerator operation, activates said throttle motor so as to make said throttle opening degree agree with said target opening degree, calculates the speed difference between said input rotation speed and said output rotation speed, and sets said target opening degree to a value lower than a reference value calculated based on said amount of accelerator operation when said speed difference is below a prescribed value.

7. The power control unit as described in claim 6, characterized in that said control part resets said target opening degree to said reference value after a prescribed engagement control time has elapsed.

8. The power control unit as described in claim 6, characterized in that said control part calculates an estimated engagement time for said one-way clutch to engage, based on the rate of change in said speed difference, and controls said throttle opening degree depending on said estimated engagement time.

9. The power control unit as described in claim 6, characterized in that said control part regulates the amount of decrease of said target opening degree with respect to said reference value depending on said rate of change in speed difference.

10. The power control unit as described in claim 9, characterized in that when said rate of change in speed difference is larger, said amount of decrease is set to a larger value.

* * * * *